United States Patent
Yamagishi

(10) Patent No.: US 7,196,713 B1
(45) Date of Patent: Mar. 27, 2007

(54) IMAGE PROCESSING SYSTEM, APPARATUS, METHOD, AND SOFTWARE

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/328,469

(22) Filed: Jun. 9, 1999

(30) Foreign Application Priority Data

Jun. 9, 1998 (JP) ............................................ 10-160997

(51) Int. Cl.
*B41J 2/525* (2006.01)
*G03C 15/01* (2006.01)

(52) U.S. Cl. ...................................... 347/116; 358/1.15
(58) Field of Classification Search ................. 347/116, 347/118, 119, 900, 115; 358/1.15, 1.16, 501
See application file for complete search history.

(56) References Cited

U.S. PATENT DOCUMENTS 5,099,260 A * 3/1992 Sato et al. ................... 347/116
6,097,499 A * 8/2000 Casey et al. ................ 358/1.16

* cited by examiner

*Primary Examiner*—Joan Pendegrass
(74) *Attorney, Agent, or Firm*—Fitzpatrick, Cella, Harper & Scinto

(57) ABSTRACT

To correct the distance between respective drums and supply image data, an image processing system using a 4-drum type color image forming apparatus requires a large-capacity image memory for temporarily storing transferred image data, and is inevitably expensive. In this invention, image data of four colors isochronously transferred via a high-speed serial interface such as an IEEE 1394 interface are respectively supplied to image processing units and image forming units via delay memories. Therefore, the time difference required for the print sheet to reach each drum can be corrected in each image forming unit to appropriately form an image at a high speed and low cost.

21 Claims, 27 Drawing Sheets

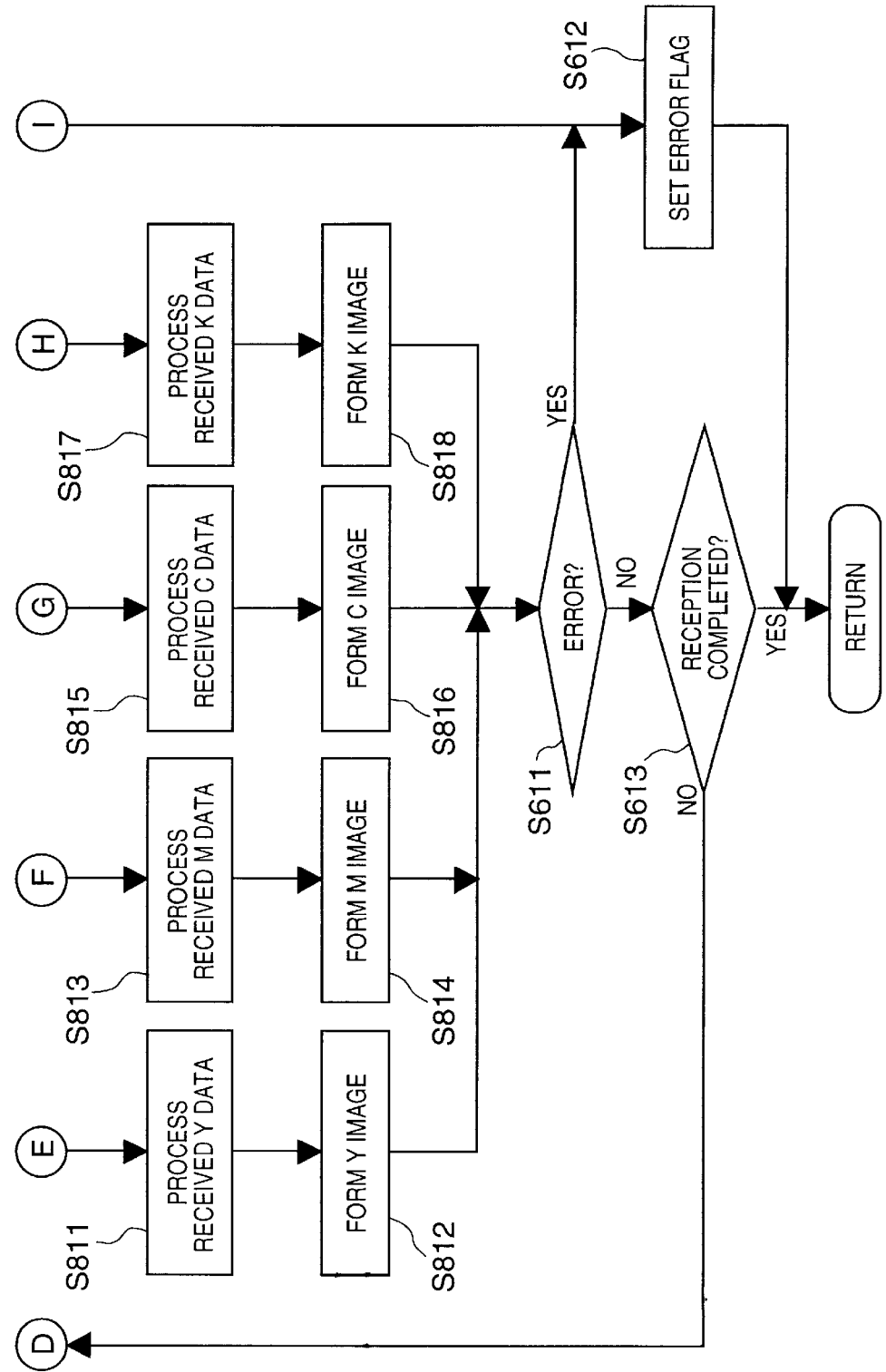

☐ : PORT
p : PORT CORRESPONDING TO PARENT NODE
c : PORT CORRESPONDING TO CHILD NODE

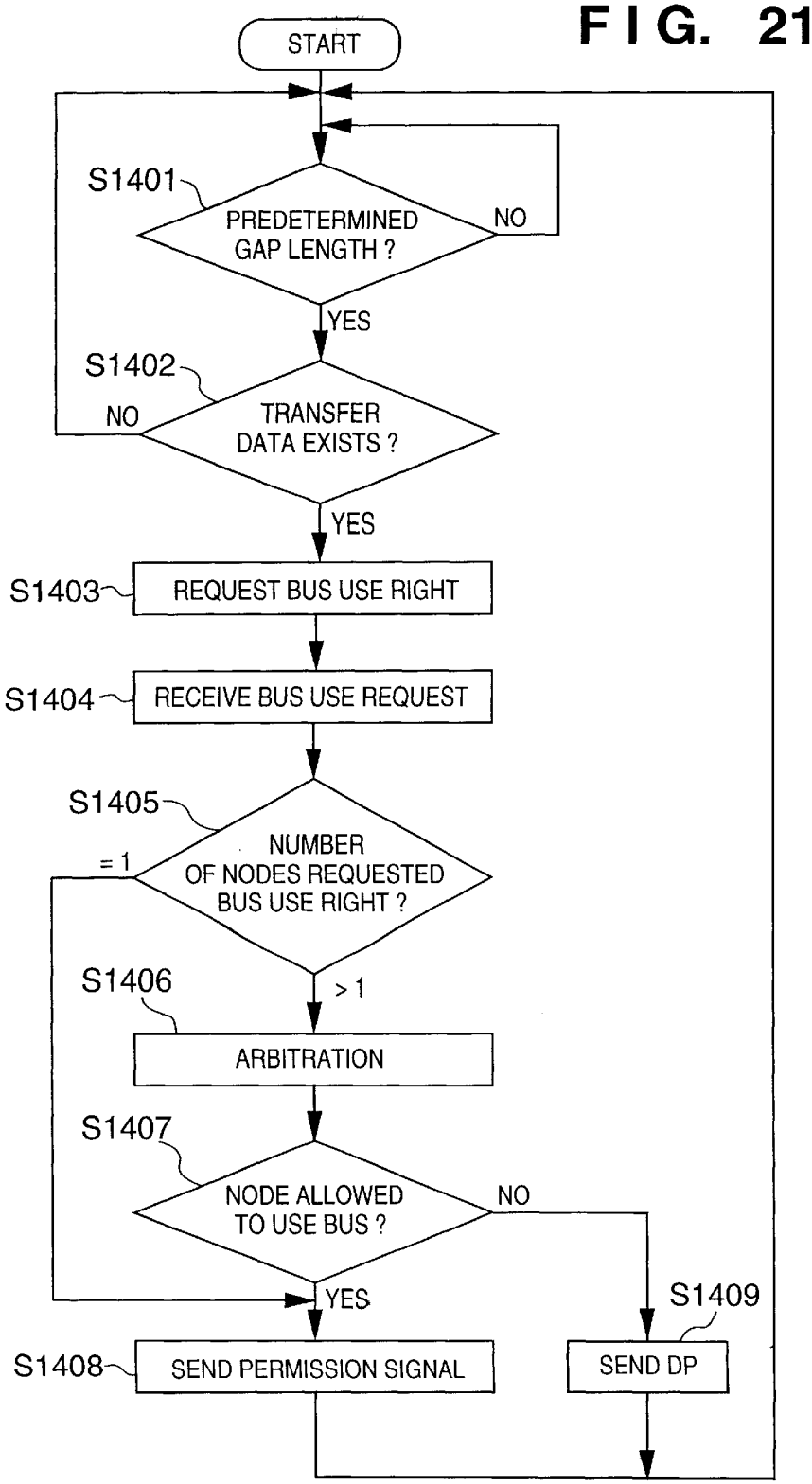

ISOCHRONOUS DATA PACKET

IMAGE PROCESSING SYSTEM, APPARATUS, METHOD, AND SOFTWARE

BACKGROUND OF THE INVENTION

1. Field of the Invention

This invention relates to an image processing system and image forming apparatus for forming a color image by the image forming apparatus on the basis of data transferred from an image processing apparatus, an image processing method, and a recording medium.

2. Description of the Related Art

A conventionally known image forming apparatus for forming a color image by an electrophotographic printing method forms a color image by repeating image formation operation four times for yellow, magenta, cyan, and black planes using one photosensitive drum and one transfer drum.

In an image processing system for transferring image data from a computer and forming an image on a print sheet using this 1-drum type color image forming apparatus, the print sheet is taken up to the transfer drum, and image data for forming a yellow image is transferred to form an image. Then, image data for forming a magenta image is transferred to form an image, image data for forming a cyan image is transferred to form an image, and image data for forming a black image is transferred to form an image. The print sheet is removed from the transfer drum to fix the images, thereby printing a color image.

The image processing system using the 1-drum type color image forming apparatus requires only one pair of mechanisms necessary for forming an image, such as a photosensitive drum, and can transfer image data of the respective colors four times. Therefore, this system can form a color print with a relatively inexpensive construction without requiring any large-capacity image memory necessary for temporarily storing image data of the respective colors.

Another conventionally known color image forming apparatus for forming a color image by an electrophotographic printing method forms a color image by using four, yellow, magenta, cyan, and black photosensitive drums and performing one image formation operation for each drum.

In an image processing system for transferring image data from a computer and forming an image on a print sheet using this 4-drum type color image forming apparatus, image data of yellow, magenta, cyan, and black colors transferred from the computer are temporarily stored in image memories for the respective colors. Images are formed by sequentially reading out the image data of the respective colors from the image memories in units of colors in synchronism with convey timings of a print sheet to the respective photosensitive drums. The images are fixed to print a color image.

The image processing system using the 4-drum type color image forming apparatus can form a color image by one print sheet convey operation, thus realizing relatively high-speed printing.

However, the conventional image processing system, e.g., the construction using the 1-drum type color image forming apparatus is difficult to perform high-speed printing because image formation is repeated four times for the respective colors.

The system construction using the conventional 4-drum type color image forming apparatus can perform higher-speed printing than the 1-drum type system. However, the respective photosensitive drums are arranged apart from each other by a predetermined distance owing to the mechanism layout, and the print sheet is sequentially conveyed to the plurality of photosensitive drums. For this reason, the system must supply image data of the respective colors after correcting the time difference required for the print sheet to reach each photosensitive drum. This system must comprise a large-capacity image memory necessary for temporarily storing image data of the respective colors, resulting in high cost.

SUMMARY OF THE INVENTION

Accordingly, it is an object of the present invention to provide an image processing system and image forming apparatus capable of printing, at a high speed, image data transferred from an image processing apparatus with a low-cost construction in the image forming apparatus connected to the image processing apparatus, an image processing method, and a recording medium.

According to the present invention, the foregoing object is attained by providing an image processing system connecting an image processing apparatus and an image forming apparatus by a serial bus, said image processing apparatus comprising first communication means for isochronously transferring a plurality of types of image data via said serial bus, said image forming apparatus comprising second communication means for receiving the plurality of types of image data isochronously transferred via said serial bus; delay means for respectively delaying the received plurality of types of image data; and a plurality of image forming means for forming images on a print medium on the basis of the delayed plurality of types of image data.

Since image data can be isochronously transferred from the image processing apparatus to the image forming apparatus via the serial bus, the image forming apparatus can absorb the arrival time difference of the print medium between the image forming means with only a small-capacity delay memory, thereby appropriately forming a color image at a high speed.

And it is another object of the present invention to provide an image processing system and image forming apparatus capable of printing, at a high speed, image data transferred from an image processing apparatus with a lower-cost construction in the image forming apparatus connected to the image processing apparatus, an image processing method, and a recording medium.

According to the present invention, the foregoing object is attained by providing an image processing system connecting an image processing apparatus and an image forming apparatus by a serial bus, said image processing apparatus comprising control means for controlling to delay a plurality of types of image data; and first communication means for isochronously transferring the delayed plurality of types of image data via said serial bus, said image forming apparatus comprising second communication means for receiving the plurality of types of image data isochronously transferred via said serial bus; and a plurality of image forming means for forming images on a print medium on the basis of the plurality of types of image data.

Since image data of respective colors can be properly delayed in the image processing apparatus and then isochronously transferred via the serial bus, the image forming apparatus can appropriately form a color image at a high speed without considering any arrival time difference of the print medium between the image forming means.

The invention is particularly advantageous since the image forming apparatus connected to the image processing apparatus can print, at a high speed, image data transferred from the image processing apparatus with a low-cost construction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 13A and 13B are flowcharts showing the printing routine of the image forming apparatus in the second embodiment;

FIG. 21 is a flowchart showing a procedure of the bus arbitration;

DETAILED DESCRIPTION OF THE PREFERRED EMBODIMENTS

Preferred embodiments of the present invention will now be described in detail in accordance with the accompanying drawings.

First Embodiment

The present embodiment employs an interface (hereinafter referred to as "1394 serial bus", specified by IEEE 1394, as a digital I/F connecting device. Hereinafter, the outline of the 1394 serial bus is described.

<<Outline of 1394 Serial Bus>>

With the appearance of home-use digital video tape recorders (VTR) and digital video disk (DVD) players, there is a need for transferring, in real time, a large amount of data such as video data and audio data (hereinafter referred to as "AV data"). To transfer AV data in real time to a personal computer (PC) or other digital devices, an interface capable of high-speed data transfer is required. The 1394 serial bus has been developed in view of the above purpose.

Figure 16:
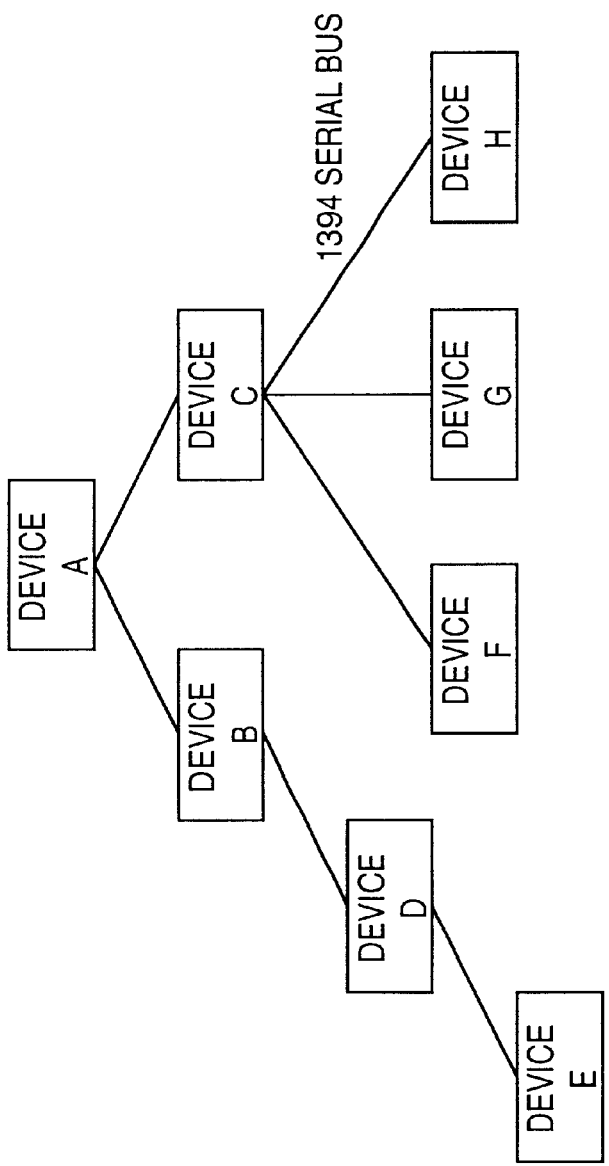
FIG. 16 is a block diagram showing an example of a network system constructed with an 1394 serial bus.

FIG. 16 shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VTR, a DVD player, a digital still camera, a storage device using a storage medium such as a hard disk or an optical disk, a monitor such as a CRT or an LCD, a tuner, an image scanner, a film scanner, a printer, a MODEM, and a terminal adapter (TA) and so forth. Note that the printer may employ any printing methods, e.g., an electrophotographic printing method using a laser beam or an LED, an ink-jet printing method, a sublimation type or ink melting type thermal-transfer printing method, a thermal printing method or the like.

The connection between the devices may be made by intermixing a daisy chain method and a node branching method, thus realizing high-freedom of connecting. The respective devices have an ID, and they construct a network by identifying each ID within a range connected by the 1394 serial bus. For example, the devices, respectively, take a relaying role when connected in a daisy-chain with cables for the 1394 serial bus, thus constructing a network.

As the 1394 serial bus corresponds to Plug and Play function, it automatically recognizes a device connected to the cable for the 1394 serial bus, thus recognizes connection status. In the system as shown in FIG. 16, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as control signals, an isochronous transfer mode for transferring isochronous data such as realtime AV data are available. In data transfer, within each cycle (generally 125 ms/cycle), a cycle start packet (CSP) indicating the start of cycle is transferred, and then asynchronous and isochronous data are mixedly transferred such that the isochronous data transfer is transferred prior to the asynchronous data.

Figure 17:
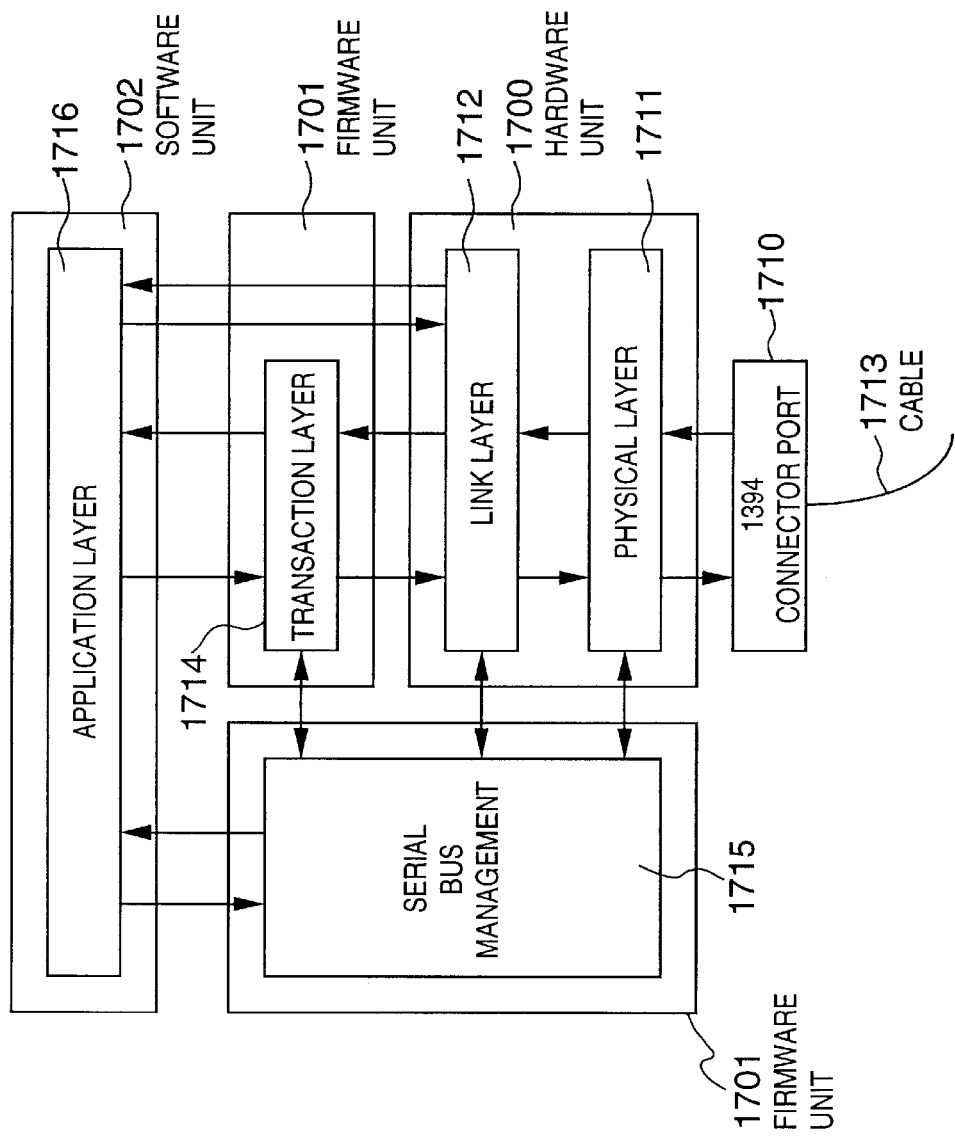
FIG. 17 is a block diagram showing the construction of the 1394 serial bus.

FIG. 17 shows the construction of the 1394 serial bus. The 1394 serial bus has a layer structure. As shown in FIG. 17, a connector port 1710 is connected to a connector at the end of a cable 1713 for the 1394 serial bus. A physical layer 1711 and a link layer 1712 in a hardware unit 1700 are positioned as upper layers with respect to the connector port 1710. The hardware unit 1700 comprises interface chips. The physical layer 1711 performs coding, connection-related control and the like, and the link layer 1712, packet transfer, cycle-time control and the like.

In a firmware unit 1701, a transaction layer 1714 manages data to be transferred (transaction data), and outputs commands Read, Write and Lock. A management layer 1715 in the firmware unit 1701 manages connection statuses and IDs of the respective devices connected to the 1394 serial bus, thus manages the network construction. The above hardware and firmware units substantially construct the 1394 serial bus.

In a software unit 1702, an application layer 1716 differs according to software used by the system, and the data transfer protocol indicating how to transfer data on the interface is defined by a protocol such as a printer protocol or an AVC protocol.

Figure 18:
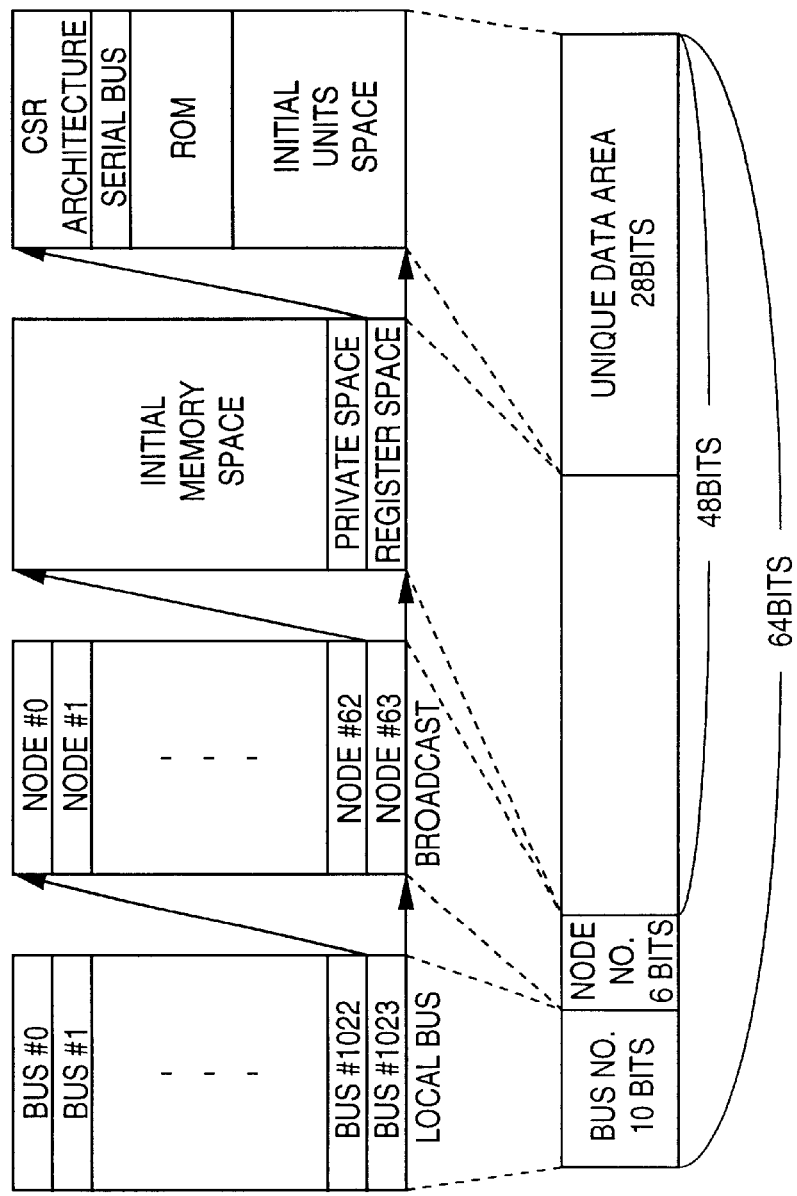
FIG. 18 is an explanatory view showing address map of the 1394 serial bus.

FIG. 18 shows an example of address space of the 1394 serial bus. All the devices (nodes) connected to the 1394 serial bus have a unique 64 bit address. The 64 bit address is stored in a memory of the devices. Data communication with a designated destination device can be performed by always recognizing the node addresses of the transmitting- and receiving-side nodes.

Addressing of the 1394 serial bus is made based on the IEEE 1212 standards, such that first 10 bits are allocated for designating a bus number, then next 6 bits are allocated for designating an node ID. The remaining 48 bits are the address width allocated to the device, and can be used as unique address space. For instance, the last 28 bits can be used as unique data area for storing data such as a device identification or data indicative of usage conditions.

The 1394 serial bus has the construction as described above. Next, the features of the 1394 serial bus which is largely related to the present invention will be described in more detail. <<Details of 1394 Serial Bus>>

[Bus-Reset Sequence]

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 1710.

When the bus-reset signal is sent from one node, the physical layer 1711 of the respective nodes receives the bus-reset signal, and at the same time, notifies the link layer 1712 of the occurrence of bus reset, and forwards the bus-reset signal to the other nodes. When all the nodes have received the bus-reset signal, a bus-reset sequence is started. Note that the bus-reset sequence is started when the cable is attached/detached, or the hardware unit 1700 has detected network abnormality or the like. Further, the bus-reset sequence is also started by a direct instruction to the physical layer 1711 such as host control by a protocol. As the bus-reset sequence is started, data transfer is suspended during the bus reset, and after the bus reset, the data transfer is restarted in the new network construction.

[Node-ID Determination Sequence]

After the bus reset, the respective nodes start to obtain a node ID so as to construct a new network construction. Detailed steps of the node-ID determination steps will be described with reference to the network example shown in FIG. 19.

Figure 19:
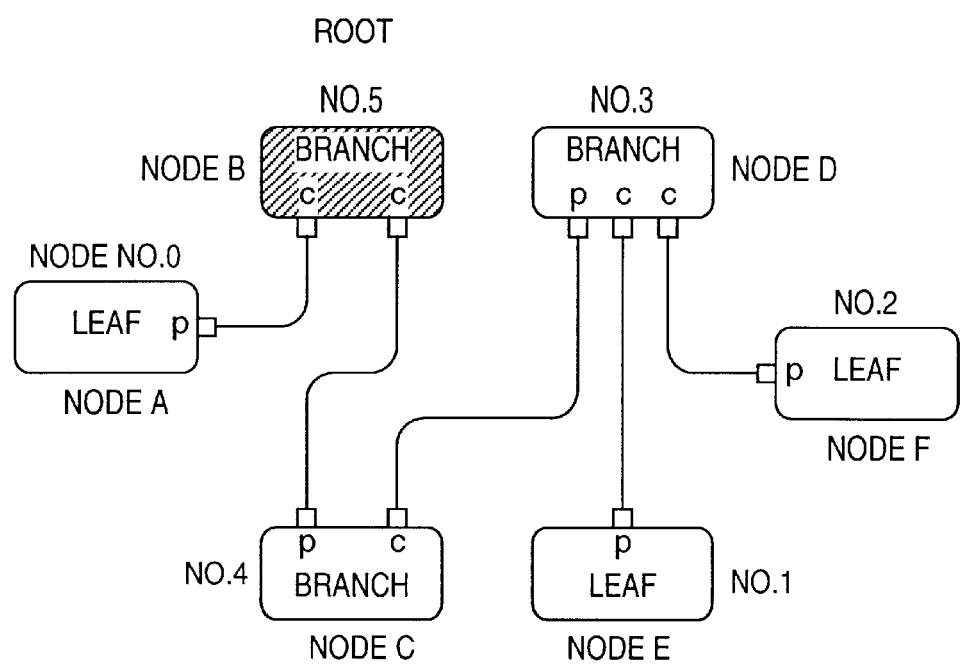
FIG. 19 is an example of a topological map for determining a node ID by the 1394 serial bus.

In the network in FIG. 19, a node B as a root is directly connected to its lower nodes A and C; the node C is directly connected to its lower node D; and the node D is directly connected to its lower nodes E and F. The procedure of determining this hierarchical structure, the root node and the node IDs will be described below.

After the bus reset has occurred, to recognize connection statuses of the respective nodes, parent-child relation is declared between ports of directly connected nodes. "parent" means a node at an upper level and "child" means a node at a lower level in the hierarchical structure. In FIG. 19, the node that first declared parent-child relation after the bus reset is the node A. As described above, nodes (leaves) where only one port is connected can start declaration of parent-child relation. That is, if the number of ports is "1", it is recognized that the node is the end of the network tree, i.e., a leaf. The declaration of parent-child relation is started from the leaf which has first taken action among these leaves. Thus, a port of the leave node is set as a "child", while the port of another node connected to the leave node is set as a "parent". In this manner, "child-parent" relation is sequentially set between the nodes A and B, between the nodes E and D, and between the nodes F and D.

Further, among upper nodes having a plurality of ports, i.e., branches, parent-child relation is sequentially declared with respect to upper node(s), from the node that first received declaration of parent-child relation from the leaf. In FIG. 19, first parent-child relation is determined between the nodes D and E and between the nodes D and F. Then the node D declares parent-child relation with respect to the node C, and as a result, a relation "child-parent" is set between the nodes D and C. The node C, that has received the declaration of parent-child relation from the node D, declares parent-child relation with respect to the node B connected to the other port, thus "child-parent" relation is set between the nodes C and B.

In this manner, the hierarchical structure as shown in FIG. 19 is constructed. The node B, that has finally become the parent at all the ports, is determined as a root. Note that a network has only one root. In a case where the node B that has received declaration of-parent-child relation from the node A immediately declares parent-child relation with respect to another node, the other node, e.g., the node C, may be the root node. That is, any node may be a root depending upon timing of transmitting declaration of parent-child relation, and further, even in a network maintaining the same construction, a particular node is not always become a root.

As the root node has been determined, the sequence of determining the respective node IDs is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaf nodes. In numerical order, node number =0, 1, 2, . . . is assigned. Then, by the broadcasting of ID information, it is recognized that the node number has been assigned.

As all the leaf nodes have obtained a node number, node numbers are assigned to the branches. Similar to the assignment of node numbers to the leaf nodes, ID information is broadcasted from the branch that received a node number, and finally, the root broadcasts its ID information. Accordingly, the root node always has the largest node number.

Thus, as the ID setting of the overall hierarchical structure has been completed and the network has been constructed, then the bus initialization is completed.

[Arbitration]

The bus arbitration in the physical layer 1711 will be described.

The 1394 serial bus always performs arbitration of a bus-use right prior to data transfer. The devices connected to the 1394 serial bus respectively relay a signal transferred on the network, thus constructing a logical bus-type network transmitting the signal to all the devices within the network. This necessitates bus arbitration to avoid packet conflict. As a result of bus arbitration, one node can transfer data during a certain period.

Figure 20A:
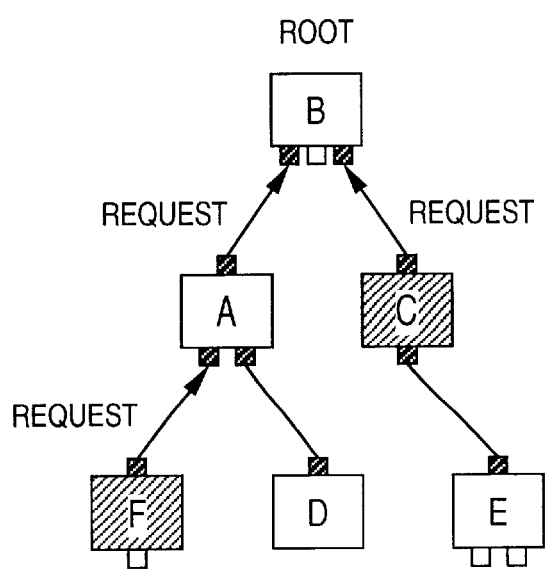
FIGS. 20A and 20B are block diagrams explaining arbitration by the 1394 serial bus.
Figure 20B:
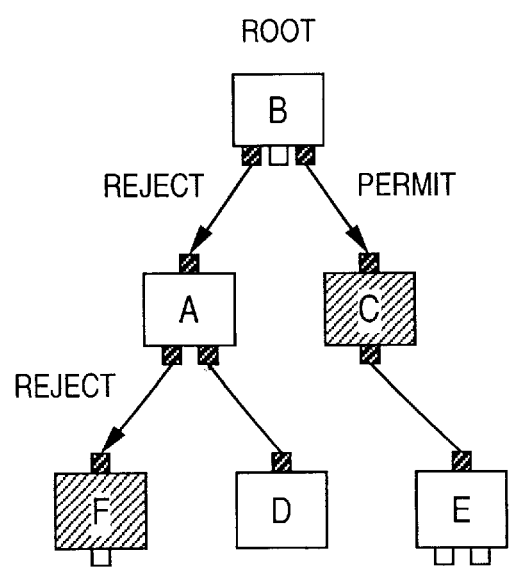

FIGS. 20A and 20B are block diagrams explaining the bus arbitration. FIG. 20A shows operation to request a bus use right; and FIG. 20B, operation to allow to use the bus.

When the bus arbitration is started, a single or plurality of nodes respectively request a bus use right to use the bus to its parent node. In FIG. 20A, the nodes C and F request a bus use right. The parent node (node A in FIG. 20A) that has received the request relays the request by further requesting a bus use right to its parent node. The request is forwarded to a root (node B in FIG. 20A) that finally performs arbitration.

The root node that has received the request for bus use right determines a node to be provided with the bus use right. This arbitration can be performed only by the root node. The node that dominated in the arbitration is provided with the bus use right. FIG. 20B shows that the node C has obtained the bus use right and the request from the node F has been rejected.

The root sends a DP (data prefix) packet to nodes lost in the bus arbitration so as to notify that their requests have been rejected. The requests from those nodes are held by the next bus arbitration.

Thus, the node that obtained the bus use permission starts data transfer.

The sequence of the bus arbitration will be described with reference to the flowchart of FIG. 21.

To start data transfer by a node, the bus must be in idle status. To confirm that data transfer has been completed and the bus is currently in idle status, each node detects a gap length of a predetermined idle period (e.g., sub-action gap) set in each transfer mode, and it determines whether or not the bus is currently in idle status based on the detection result.

At step S1401, the node determines whether or not a predetermined gap length corresponding to asynchronous data or isochronous data to be transferred has been detected. So far as the node has not detected the predetermined gap length, it cannot request a bus use right to start data transfer, accordingly, the node waits until the predetermined gap length has been detected.

When the predetermined gap length has been detected at step S1401, the node determines whether or not there is data to be transferred at step S1402. If YES, it issues a signal requesting a bus use right to the root at step S1403. As shown in FIG. 20A, this signal requesting the bus use right is relayed by the respective devices in the network, and forwarded to the root. If it is determined at step S1402 that there is no data to be transferred, the process returns to step S1401.

At step S1404, if the root has received a single or plurality of request signals for the bus use right, it examines the number of nodes requesting the bus use right at step S1405. From the determination at step S1405, if the number of the nodes requested the bus use right is one, that node is provided with bus use permission immediately after the requirement. On the other hand, if the number of the nodes is more than one, arbitration is performed to determine one node to be provided with the bus use right immediately after the requirement. The arbitration does not always provide a bus use right to the same node, but equally provides a bus use right to the respective nodes (fair arbitration).

The processing at the root node branches at step S1407 into processing for the node dominated in the arbitration at step S1406, and processing for the other nodes lost in the arbitration. In a case where there is one node that requested the bus use right, or one node has dominated in the arbitration, the node is provided with an permission signal indicative of bus use permission at step S1408. The node starts data (packet) transfer immediately after it receives the permission signal (step S1410). On the other hand, the nodes lost in the arbitration receive a DP (data prefix) packet indicative of rejection of the bus use request at step S1409. The processing for the node that received the DP packet returns to step S1401 to request a bus use right again. Also, the processing for the node that completed data transfer at step S1410 returns to step S1401.

[Asynchronous Transfer]

Figure 22:
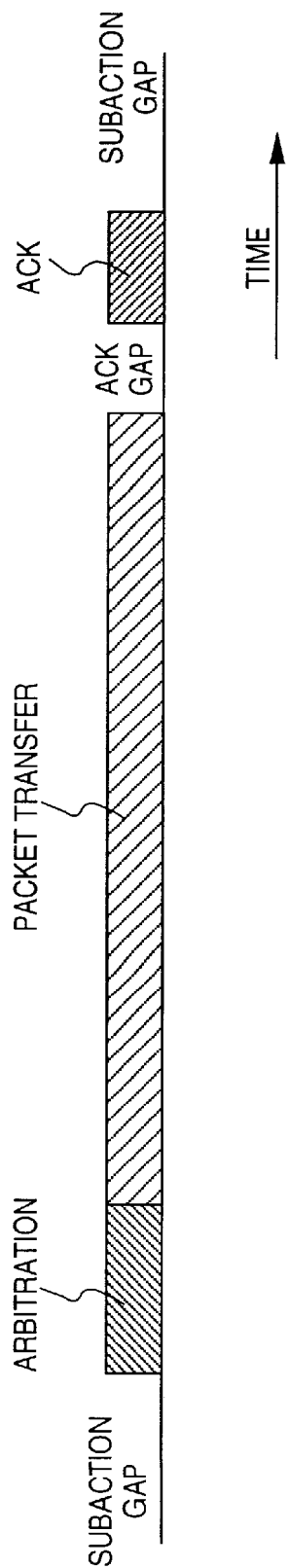
FIG. 22 is a timing chart showing transitional statuses in asynchronous data transfer.

Hereinafter, asynchronous transfer mode (ATM), which is one of the data transfer mode in the 1934 serial bus, is described. FIG. 22 shows transition in the asynchronous transfer. In FIG. 22, the first sub-action gap represents the idle status of the bus. At a point where the idle time has become a predetermined value, a node which is to perform data transfer requests a bus use right, then bus arbitration is executed.

When the use of bus has been allowed by the arbitration, data in the form of packet is transferred, and a node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 23:
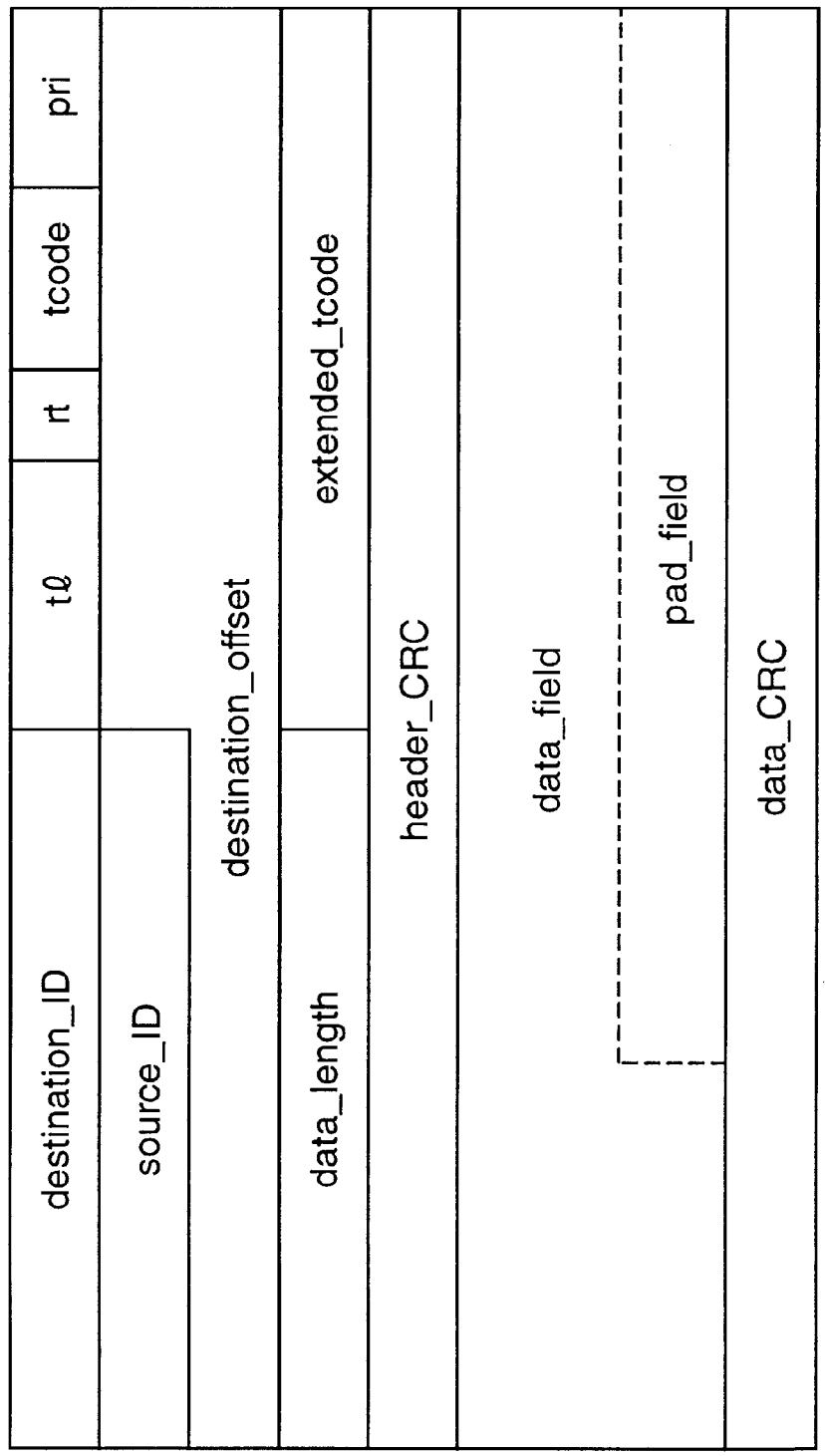
FIG. 23 is a diagram showing a packet format for the asynchronous transfer.

FIG. 23 shows a packet format for asynchronous transfer. The packet has a data area, a data CRC area for error correction, and a header area in which a destination node ID, a source node ID, a transfer data length and various codes are written.

The asynchronous transfer is one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

[Isochronous Transfer]

Isochronous transfer mode (ITM), which is the other mode of the data transfer mode in the 1934 serial bus, is described. The isochronous transfer mode which is the most significant characteristic of the 1394 serial bus is appropriate to data transfer which particularly requires realtime transfer, such as AV data. Further, the asynchronous transfer is one-to-one transfer, whereas the isochronous transfer is broadcasting transfer from one sender node to all the other nodes.

Figure 24:
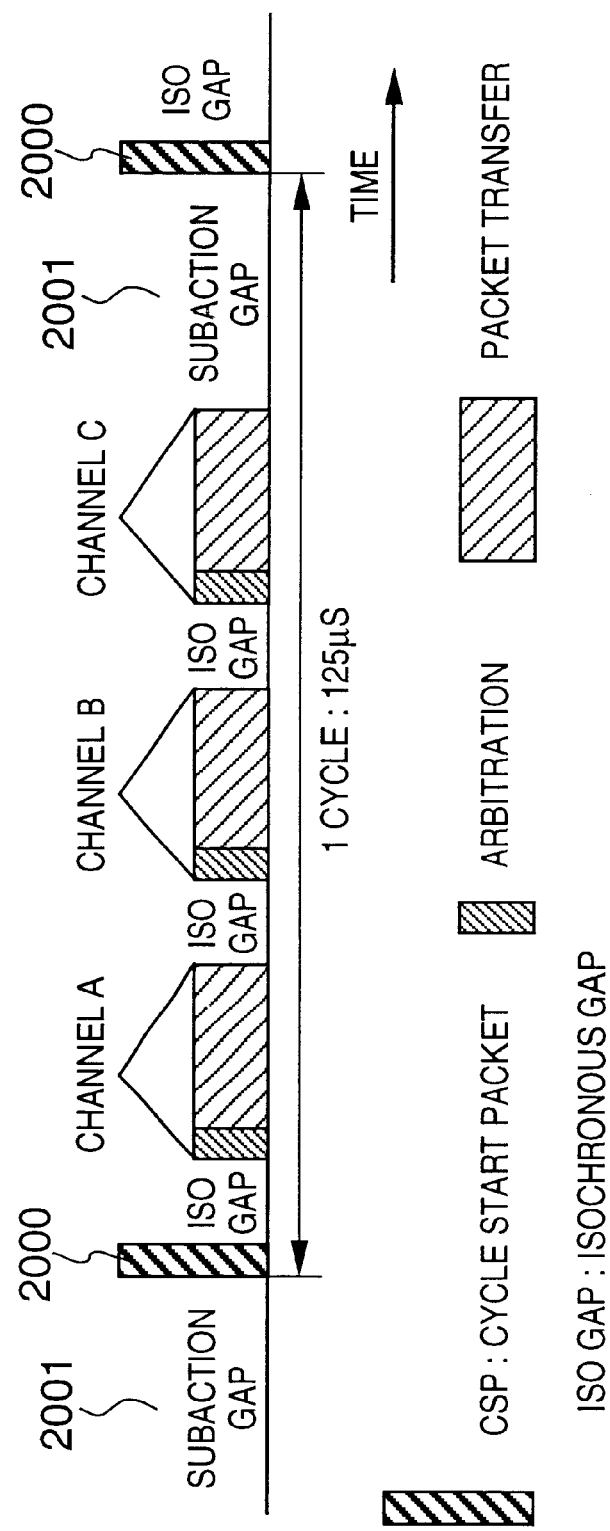
FIG. 24 is a timing chart showing transitional statuses in isochronous data transfer.

FIG. 24 shows transition in the isochronous transfer. The isochronous transfer is executed on the bus in a predetermined cycle, called "isochronous cycle". The period of the isochronous cycle is 125 µs. A cycle start packet (CSP) 2000 indicates the start of the isochronous cycle for synchronizing the operations of the respective nodes. When data transfer in a cycle has been completed and a predetermined idle period (sub-action gap 2001) has elapsed, a node which is called "cycle master" sends the CSP 2000 indicative of the start of the next cycle. That is, this interval between the issuance of CSP 2000 is 125 µs.

As channel A, channel B and channel C in FIG. 24, the respective packets are provided with a channel ID, so that plural types of packets can be independently transferred within one isochronous cycle. This enables substantially-realtime transfer among the plural nodes. The receiver node can receive only the data having a desired channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code used as a response in the asynchronous transfer is not used in the isochronous transfer.

Further, an isochronous gap (iso gap) in FIG. 24 represents an idle period necessary for confirming prior to isochronous transfer that the bus is in idle status. If a node detects the predetermined idle period, it is determined that the bus is in idle status, and if isochronous transfer is desired, bus arbitration is performed to request the bur use right.

Figure 25:
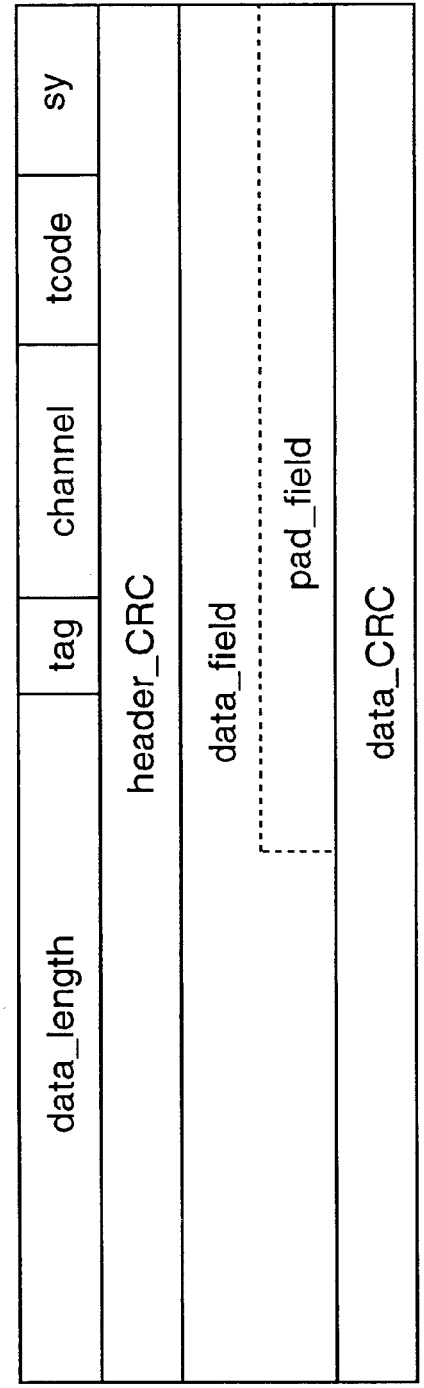
FIG. 25 is a diagram showing a packet format for the isochronous transfer.

FIG. 25 shows a packet format for isochronous transfer. Various packets divided into channels respectively have a data field, a data CRC field for error correction and a header field containing information such as a transfer-data length, a channel number, various codes and error-correction header CRC as shown in FIG. 25.

[Bus Cycle]

Figure 26:
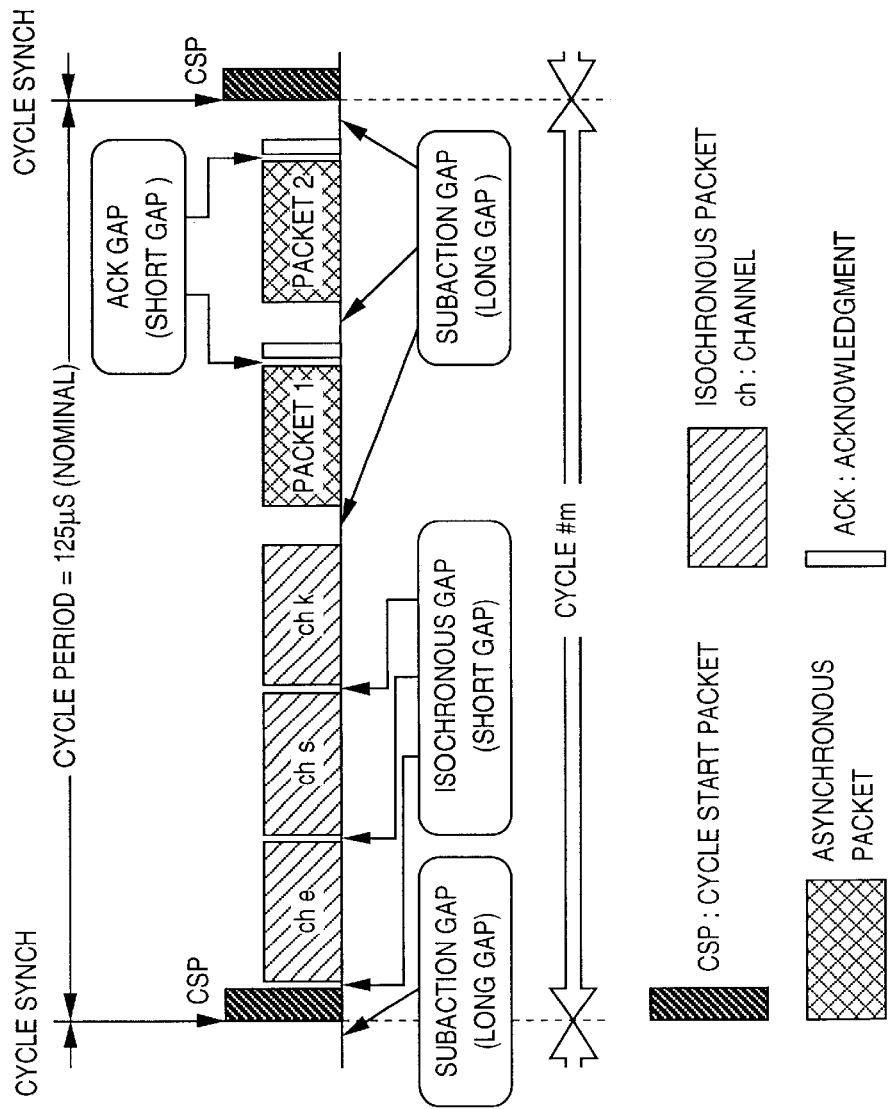
FIG. 26 is a timing chart showing transitional statuses in data transfer on the 1394 serial bus when the isochronous transfer and asynchronous transfer are mixedly performed.

In practice, both isochronous transfer and asynchronous transfer can be mixedly performed on the 1394 serial bus. FIG. 26 shows transition in the isochronous transfer and asynchronous transfer mixedly performed on the 1394 serial bus.

As mentioned above, the isochronous transfer is performed prior to the asynchronous transfer because after the CSP, the isochronous transfer can be started with a gap (isochronous gap) shorter than the gap (sub-action gap) of the idle period necessary for starting the asynchronous transfer. Accordingly, the isochronous transfer has priority over the asynchronous transfer.

In the typical bus cycle as shown in FIG. 26, upon starting the cycle #m, a CSP is transferred from the cycle master to the respective nodes. The operations of the respective nodes are synchronized by this CSP, and node(s) that waits for a predetermined idle period (isochronous gap) to perform isochronous transfer participates in bus arbitration, then starts packet transfer. In FIG. 26, a channel e, a channel s and a channel k are transferred by the isochronous transfer.

The operation from the bus arbitration to the packet transfer is repeated for the given channels, and when the isochronous transfer in the cycle #m has been completed, the asynchronous transfer can be performed. That is, when the idle period has reached the sub-action gap for the asynchronous transfer, node(s) that is to perform the asynchronous transfer participates in bus arbitration. Note that only if the sub-action gap for starting the asynchronous transfer is detected, after the completion of isochronous transfer and before the next timing to transfer the CSP (cycle synch), the asynchronous transfer can be performed.

In the cycle #m in FIG. 26, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle #m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 µs, the next isochronous cycle is shortened from the reference period 125 µs. In this manner, the isochronous cycle can be lengthened or shortened based on the reference period 125 µs.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

<<Image Processing System of First Embodiment>>

Figure 1:
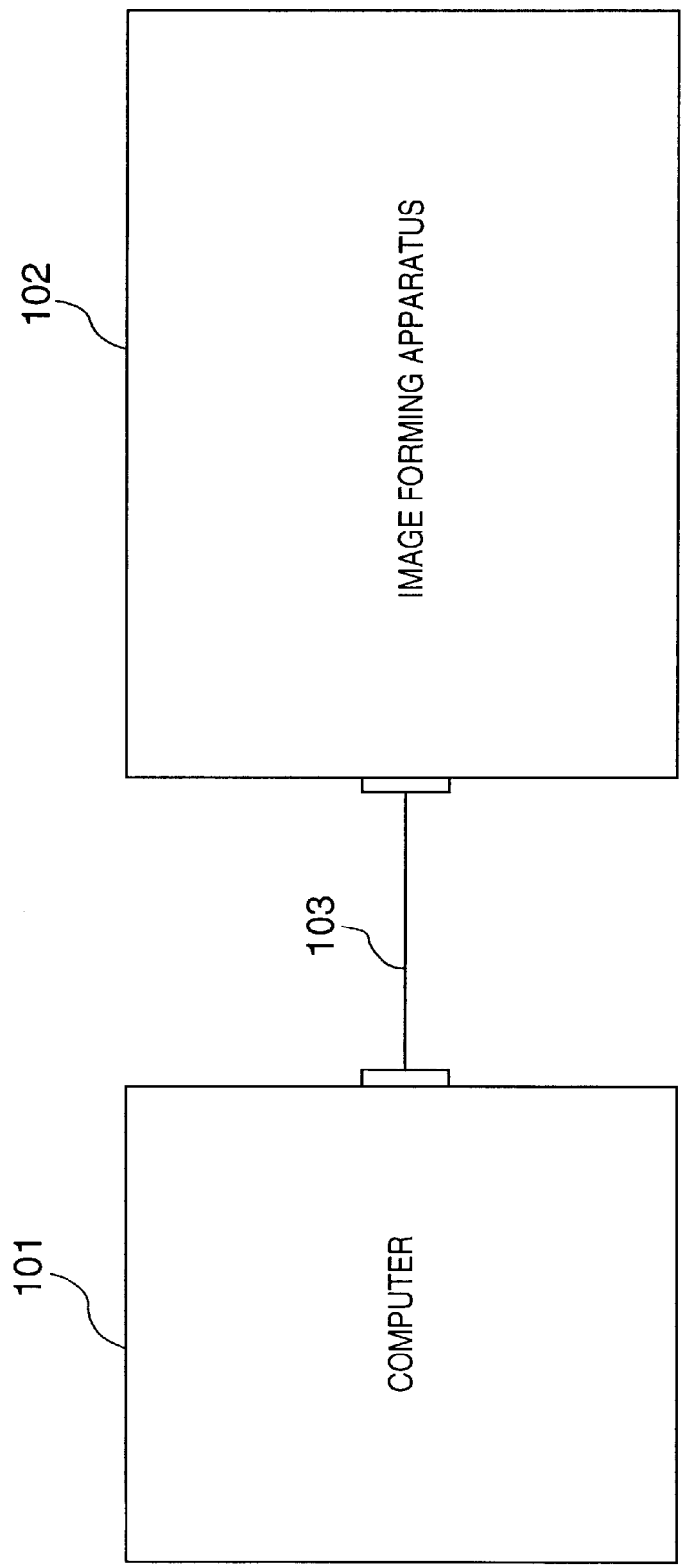
FIG. 1 is a block diagram showing the overall construction of an image processing system in the first embodiment.

FIG. 1 is a block diagram showing the construction of an image processing system in the first embodiment. In FIG. 1, reference numeral 101 denotes a computer generally used by a user that is connected to an image forming apparatus 102 via a high-speed serial communication I/F 103. The image forming apparatus 102 realizes a printing function in the computer 101. When a document or image created by the computer 101 is to be printed, the image forming apparatus 102 receives image formation data from the computer 101 via the high-speed serial communication I/F 103, performs necessary image processing, and prints out the processed data on a print sheet.

The high-speed serial communication I/F 103 is a communication I/F having a mechanism of ensuring a data transfer rate such as an isochronous transfer mode in the USB or IEEE 1394 (1394 serial bus), and is generally constituted as a high-speed serial bus. The first embodiment adopts a 1394 serial bus as the high-speed serial communication I/F 103.

<<Detailed Construction of Computer 101>>

The detailed construction of the computer 101 will be explained with reference to the functional block diagram shown in FIG. 2.

Figure 2:
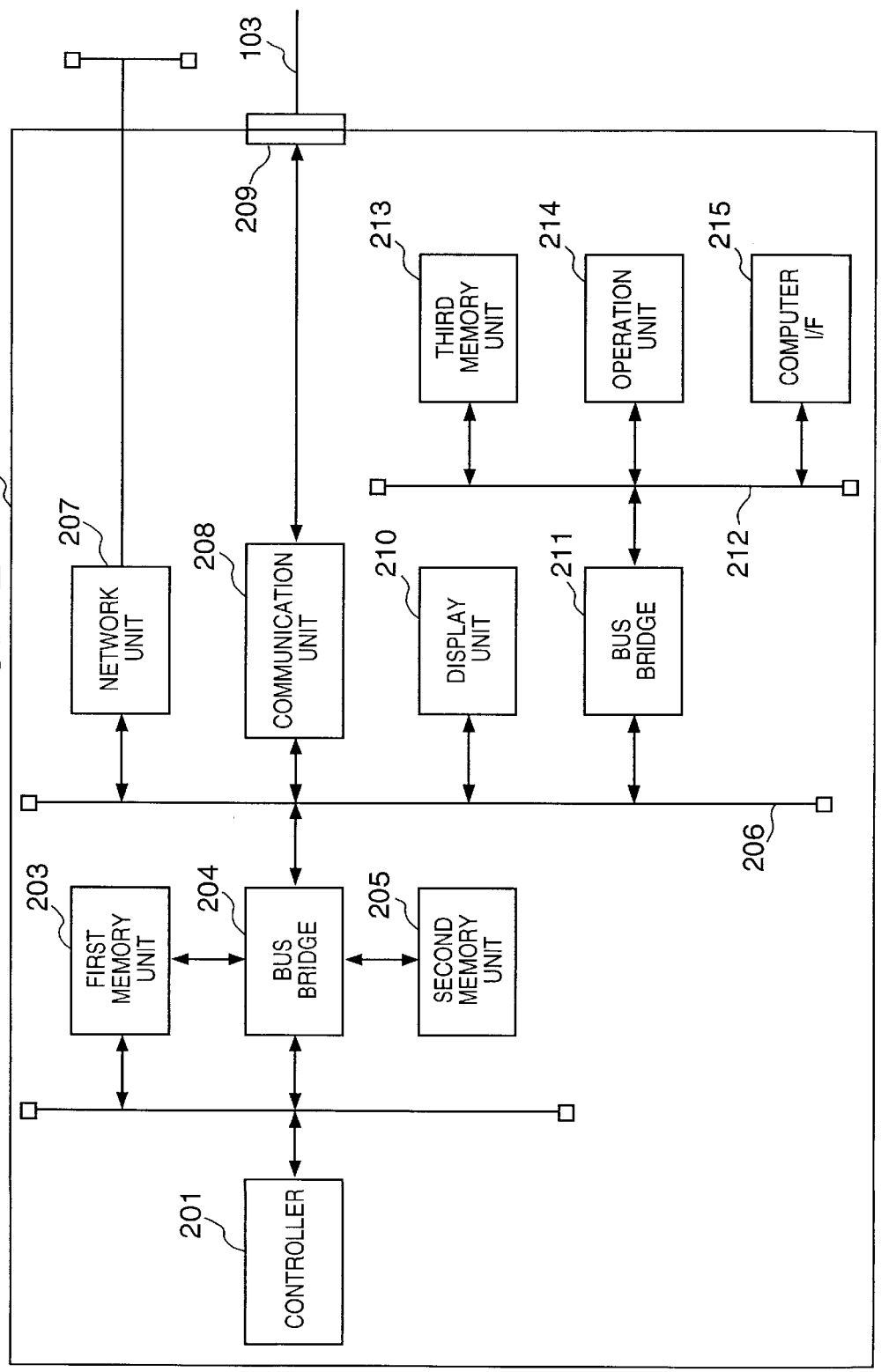
FIG. 2 is a block diagram showing the functional construction of a computer in the first embodiment.

In FIG. 2, reference numeral 201 denotes a controller for controlling the whole computer 101; 202, a CPU bus which connects the controller 201 to a first memory unit 203 and bus bridge 204 to transfer, at a high speed, data to be processed by the controller 201; and 203, a first memory unit which serves as a cache memory used for operation of the controller 201, can be accessed by the controller 201 at a high speed, and temporarily stores data used by the controller 201 for calculation. A proper example of the first memory unit 203 is a high-speed SRAM.

Reference numeral 204 denotes a bus bridge for connecting the CPU bus 202 to a high-speed bus 206 (to be described later) and absorbing the difference in processing speed between these buses. The bus bridge 204 allows the controller 201 which operates at a higher speed to exchange data with respective units connected to the high-speed bus 206. The bus bridge 204 further has a memory controller function to perform a series of memory management operations such as an operation of reading out, at a predetermined period, data temporarily written in the first memory unit 203 by the controller 201 at a high speed and writing the data in a second memory unit 205, and an operation of writing data read out from the second memory unit 205 in the first memory unit 203 in accordance with a request from the controller 201. Reference numeral 205 denotes a second memory unit serving as a main memory used by the controller 201 to execute various applications and the like. A proper example of the second memory unit 205 is a DRAM.

Reference numeral 206 denotes a high-speed bus for connecting the bus bridge 204, network unit 207, high-speed serial communication unit 208, display unit 210, and bus bridge 211 to transfer data processed by the controller 201 to the respective units and transfer (DMA transfer) data between the respective units at a high speed. The high-speed bus 206 is generally a PCI bus or the like. Reference numeral 207 denotes a network unit for connecting the computer 101 to a network to exchange data with the network. An example of the connected network is an Ethernet or token ring. Reference numeral 208 denotes a high-speed serial communication unit which has a mechanism of ensuring a data transfer rate such as an isochronous transfer mode in the IEEE 1394 standard and can exchange a large amount of image data within a predetermined time. The isochronous transfer mode is done by ensuring a channel to which a data transfer period is guaranteed, and broadcasting a data packet using this channel. The data transfer rate can be increased by ensuring a necessary number of channels. The high-speed serial communication unit 208 further comprises a mechanism of performing one-to-one asynchronous transfer such as an asynchronous transfer mode, and can perform predetermined communication with the image forming apparatus 102 any time. Asynchronous data transfer is also done using the packet. The high-speed serial communication unit 208 appropriately controls communication matching or complying with the IEEE 1394 standard.

Reference numeral 209 denotes a high-speed serial communication connector for connecting the computer 101 to the image forming apparatus 102 via the high-speed serial communication I/F 103; 210, a display unit which is made up of a liquid crystal display device, speaker, and the like, and outputs a necessary character, image, sound, and the like in accordance with execution of a program by the controller 201; and 211, a bus bridge for connecting the high-speed bus 206 to a low-speed bus 212 (to be described below) and absorbing the difference in processing speed between these buses. The bus bridge 211 allows each unit which operates at a high speed to exchange data with a unit which is connected to the low-speed bus 212 to operate at a low speed.

Reference numeral 212 denotes a low-speed bus which connects the bus bridge 211, third memory unit 213, operation unit 214, and computer I/F 215, is formed from a bus having a lower transfer speed than the high-speed bus 206, and connects a unit having a relatively low processing speed. A proper example of the low-speed bus 212 is an ISA bus. Reference numeral 213 denotes a third memory unit which stores a plurality of applications for operating the controller 201, is formed from a large-capacity hard disk or the like, and managed by the controller 201; 214, an operation unit which is made up of a keyboard, microphone, and the like, and used to input various settings necessary for operation of the computer 101 and/or input various operation commands to the controller 201; and 215, a low-speed computer I/F for connecting the computer 101 to a peripheral device. A proper example of the computer I/F 215 is an RS-232C I/F for serial communication or centronics I/F for parallel communication.

<<Detailed Construction of Image Forming Apparatus 102>>

The detailed construction of the image forming apparatus 102 will be explained with reference to the functional block diagram shown in FIG. 3.

Figure 3:
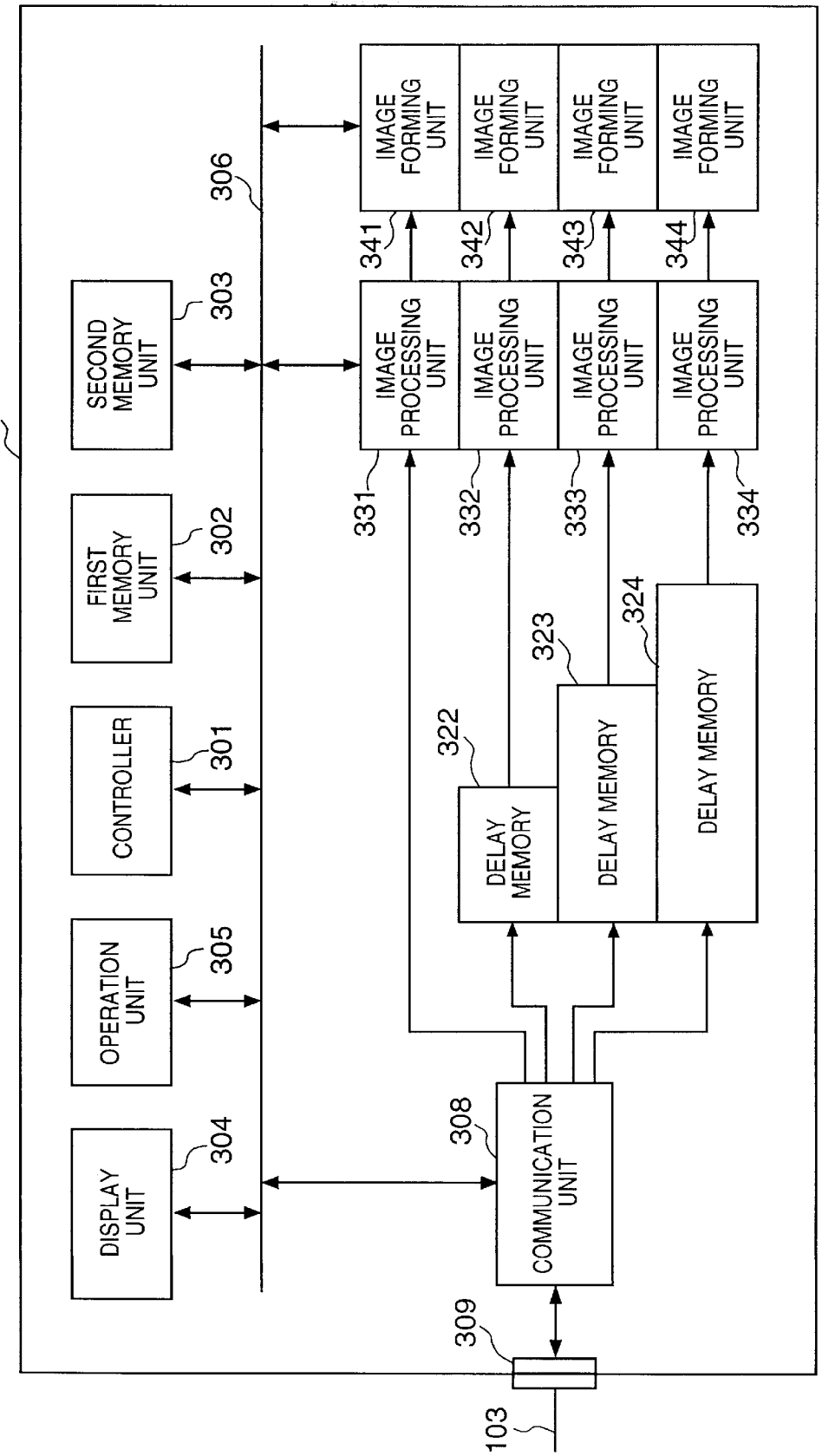
FIG. 3 is a block diagram showing the functional construction of an image forming apparatus in the first embodiment.

In FIG. 3, reference numeral 301 denotes a controller which controls the whole image forming apparatus 102 and operates by a realtime OS; 302, a first memory unit which serves as a work memory used for operation of the controller 301 and can be accessed by the controller 301 at a high speed; and 303, a second memory unit which stores a plurality of applications for operating the controller 301, is formed from a large-capacity hard disk or the like, and managed by the controller 301.

Reference numeral 304 denotes a display unit; and 305, an operation unit. The display unit 304 comprises a liquid crystal display unit, whereas the operation unit 305 comprises a touch panel input device adhered to the liquid crystal display unit and a plurality of hard keys. A signal input from the touch panel or hard key is transmitted to the controller 301 via a CPU bus 306, and the liquid crystal display unit displays image data read out and sent from the first or second memory unit 302 or 303. The liquid crystal display unit displays the operation function of the image forming apparatus, image data, and the like. The operation unit 305 may comprise an input means such as a digitizer or pen recognition mechanism for pen input, a microphone or sound recognition mechanism for sound input, or an image sensing device or image recognition mechanism for image input.

Reference numeral 306 denotes a CPU bus for connecting the controller 301, first memory unit 302, and second memory unit 303 to respective functional units to transfer data processed by the controller 301 to the respective functional units and transfer (DMA transfer) data between the respective functional units at a high speed.

Reference numeral 308 denotes a high-speed serial communication unit which has a mechanism of ensuring a data transfer rate such as an isochronous transfer mode in the IEEE 1394 standard and can exchange a large amount of image data within a predetermined time. The isochronous transfer mode is done by ensuring a channel to which a data transfer period is guaranteed, and broadcasting a data packet using this channel. The data transfer rate can be increased by ensuring a necessary number of channels. The high-speed serial communication unit 308 further comprises a mechanism of performing one-to-one asynchronous transfer such as an asynchronous transfer mode, and can perform predetermined communication with the computer 101 any time. Asynchronous data transfer is also done using the packet. The high-speed serial communication unit 308 appropriately controls communication matching or complying with the IEEE 1394 standard. Reference numeral 309 denotes a high-speed serial communication connector for connecting the image forming apparatus 102 to the computer 101 via the high-speed serial communication I/F 103.

Reference numerals 322, 323, and 324 denote drum interval correction delay memories (to be referred to as delay memories). The image forming apparatus 102 forms a color image by a 4-drum method using four photosensitive drums in which a print sheet is sequentially conveyed to the four photosensitive drums to print Y, M, C, and K images. Hence, the print timing must be corrected by the delay memories corresponding to respective drum intervals. The delay memories 322, 323, and 324 respectively correct the interval between the first and second photosensitive drums, the interval between the first and third photosensitive drums, and the interval between the first and fourth photosensitive drums. The detailed mechanism of the color image forming apparatus 102 according to the first embodiment will be explained below with reference to FIG. 15.

Reference numerals 331, 332, 333, and 334 denote image processing units for the respective colors, which perform various image processes such as smoothing, edge processing, and color correction for image data of the respective colors input directly from the high-speed serial communication unit 308 or via the delay memories 322, 323, and 324 in accordance with a processing command from the controller 301; 341, 342, 343, and 344 denote image forming units for the respective colors which form received image data as visible image data on a print sheet in units of the respective colors. An example of the image forming method is an electrophotographic printing method of forming a latent image on the photosensitive drum using a laser beam or LED beam and forming the image on the print sheet.

The mechanism of the image forming apparatus 102 will be explained with reference to FIG. 15.

The image forming apparatus 102 is roughly divided into a scanner unit 51 for inputting an image signal and a printer unit 52 for printing out the image signal.

In the scanner unit 51, an original feeder 11 sequentially feeds originals one by one from the last page to an original glass table 12, and discharges the originals onto the original glass table 12 upon completion of a read of the originals. When the original is conveyed to the original glass table 12, an internal lamp of a scanner 13 is turned on, and the scanner 13 starts moving to expose and scan the original. The light reflected by the original is guided to an image sensor 16 by a plurality of mirrors 14 and a lens 15. The image of the scanned original is read by the image sensor 16.

Image data output from the image sensor 16 is subjected to predetermined processing and transferred to the printer unit 52 via a scanner I/F and printer I/F (neither is shown; each formed from a video I/F or high-speed serial communication I/F).

In the printer unit 52, light-emitting portions 21, 22, 23, and 24 emit laser beams or LED beams in accordance with input image data of Y, M, C, and K colors. The laser beams or LED beams respectively irradiate photosensitive drums 29, 30, 31, and 32 to form latent images corresponding to the laser beams or LED beams on the photosensitive drums 29, 30, 31, and 32. Developing agents are attracted to the latent image portions of the photosensitive drums 29, 30, 31, and 32 by developing units 25, 26, 27, and 28, respectively. A print sheet is fed from either one of paper feed cassettes 41 and 42 at a timing synchronized with the start of irradiation of the laser beams or LED beams, and sequentially conveyed to transfer portions 33, 34, 35, and 36 to transfer to the print sheet the developing agents respectively attracted to the photosensitive drums 29, 30, 31, and 32.

The print sheet having the developing agents is conveyed to a fixing portion 37 where the developing agents are fixed to the print sheet by the heat and pressure of the fixing portion 37. The print sheet having passed through the fixing portion 37 is discharged by a discharge roller 38. A sorter 43 stores discharged print sheets in corresponding bins to sort the print sheets. When double-side printing is set, the print sheet having passed through the fixing portion 37 is temporarily conveyed to a convey selector 39 to reverse the rotational direction of the paper feed roller, and then guided from the convey selector 39 to a refeed convey path 40. When multiple printing is set, the print sheet is not conveyed to the discharge roller 38 but is guided to the refeed convey path 40. The print sheet guided to the refeed convey path 40 is fed at the above-described timing and sequentially conveyed to the transfer portions 33, 34, 35, and 36.

Print operation in the image processing system according to the first embodiment will be described in detail.

<<Print Operation in Computer 101>>

Figure 4:
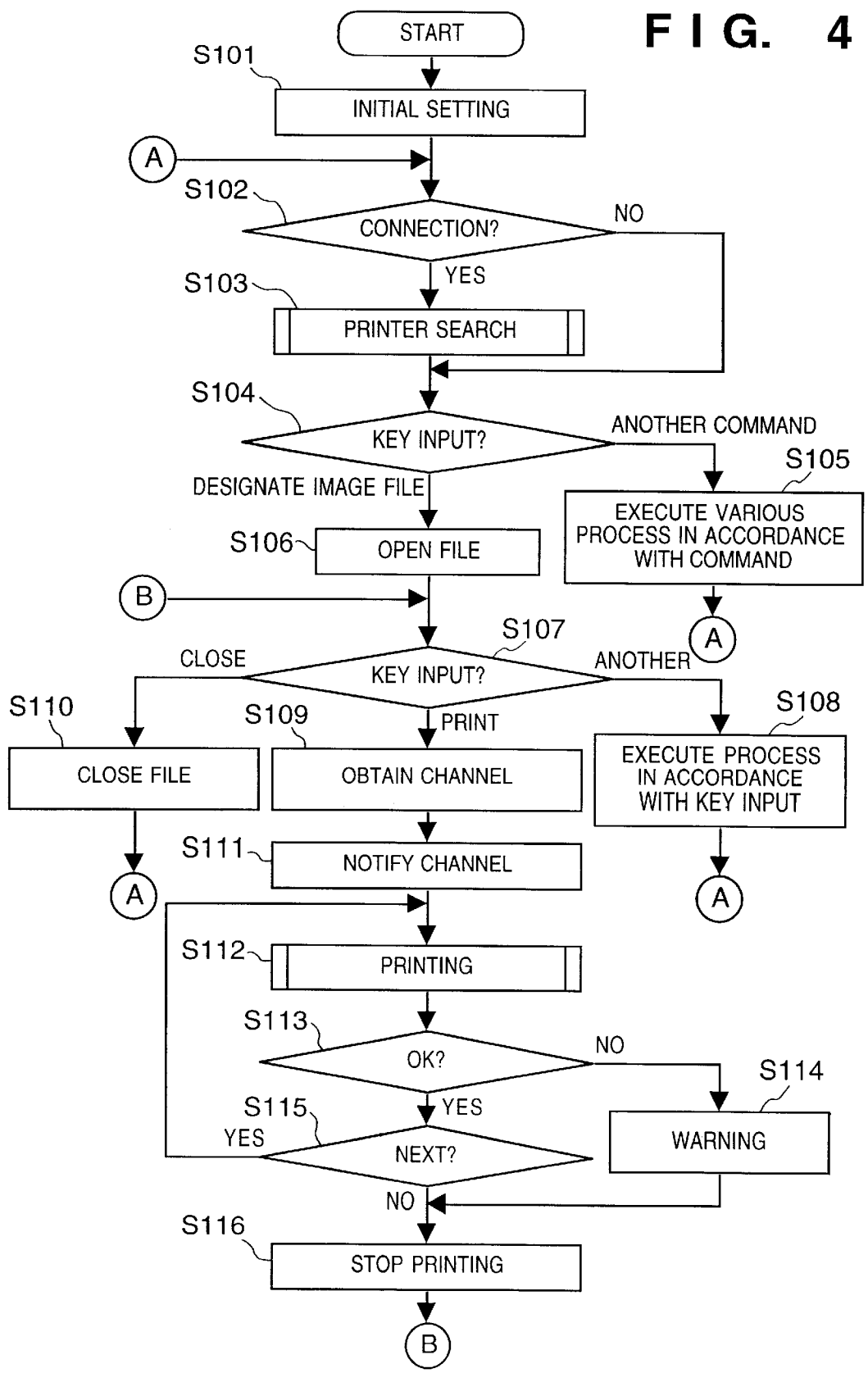
FIG. 4 is a flowchart showing the main routine of the computer in the first embodiment.

FIG. 4 is a flowchart showing the main routine of print processing in the computer 101 according to the first embodiment. Print operation in the computer 101 will be explained with reference to FIG. 4.

At step S101, if the computer 101 is turned on, the controller 201 initializes the flags, registers, control variables, and the like, and executes a control program such as an OS stored in part of the area of the second memory unit 205 after temporarily reading the program in units of predetermined amounts in the first memory unit 203 via the bus bridge 204 having the memory controller function. The controller 201 initializes the respective units of the computer 101. At step S102, the controller 201 checks whether or not a device including the computer 101 itself is newly connected to the high-speed serial communication I/F 103. If YES at step S102, the controller 201 advances to step S103 to perform printer search processing. The printer search processing at step S103 will be described in detail with reference to the flowchart of FIG. 5.

At step S104, the controller 201 checks whether or not an input from the key, touch panel, digitizer, or the like of the operation unit 214 is a command input for designating and opening an image file to be printed. If the input is, e.g., a command input for executing another processing, the controller 201 advances to step S105 to execute various processes corresponding to the input command, and returns to step S102. If the input is one designating an image file at step S104, the controller 201 advances to step S106 to read the designated image film in the second memory unit 205 from the third memory unit 213 or via the network unit 207 or high-speed serial communication I/F 103.

At step S107, the controller 201 checks whether or not the input from the operation unit 214 is a command input for printing an open image file or a command input for closing the open image file. If the input is, e.g., a command input for executing another processing, the controller 201 executes various processes corresponding to the input at step S108, and returns to step S107.

If the input is one for closing the open image file at step S107, the controller 201 advances to step S110 and closes the image file read in the second memory unit 205 to free the unnecessary area of the second memory unit 205. When the contents of the image file must be changed and stored, the controller 201 stores the changed file as a new image file in the third memory unit 213 or via the network unit 207 or high-speed serial communication I/F 103.

If the input is one for printing the open image file at step S107, the controller 201 advances to step S109 to obtain by the high-speed serial communication unit 208 a necessary number of channels to which a data transfer period such as the isochronous transfer mode is guaranteed on the high-speed serial communication I/F 103. At step S111, the controller 201 notifies the image forming apparatus 102 of the identification numbers of one or a plurality of obtained channels by one-to-one asynchronous transfer such as the asynchronous transfer mode via the high-speed serial communication unit 208, high-speed serial communication connector 209, and high-speed serial communication I/F 103. At step S112, the controller 201 isochronously transfers image data to the image forming apparatus 102 using one or a plurality of channels notified to the image forming apparatus 102. Then, the image forming apparatus 102 executes print processing of printing the image data. Details of the print processing at step S112 will be described with reference to the flowchart of FIG. 6.

Upon completion of the print processing at step S112, the controller 201 advances to step S113, and if an error occurs in the print processing, generates a predetermined warning using an image, sound, or sentence by the display unit 210 at step S114, and sends a print stop command to the image forming apparatus 102 at step S116 to stop the print operation. After sending the print stop command, the controller 201 returns to step S107. If NO at step S113 and the next print operation is to be subsequently executed at step S115, the controller 201 returns to step S112 to repeat a series of operations. If NO at step S115, the controller 201 sends a print stop command to the image forming apparatus 102 at step S116 to stop the print operation. After sending the print stop command, the controller 201 returns to step S107.

[Printer Search Processing]

Figure 5:
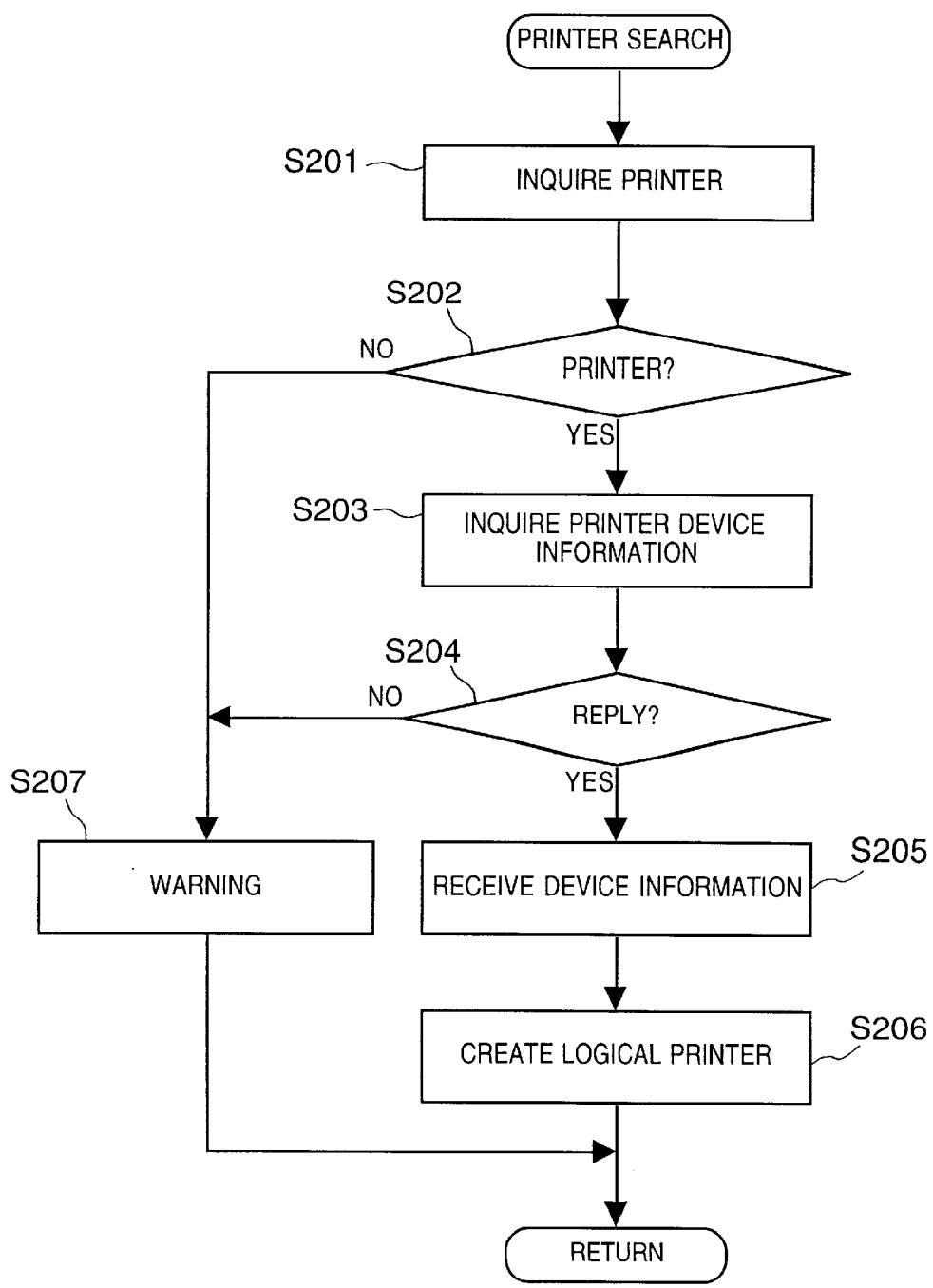
FIG. 5 is a flowchart showing the printer search routine of the computer in the first embodiment.

FIG. 5 is a flowchart showing detailed printer search processing at step S103 of FIG. 4. In FIG. 5, at step S201, the controller 201 inquires by the high-speed serial communication unit 208 whether or not a device newly connected to the high-speed serial communication I/F 103 is a printer such as the image forming apparatus 102, i.e., can transfer and print image data. If a target printer, e.g., the image forming apparatus 102 exists on the high-speed serial communication I/F 103 at step S202, the controller 201 subsequently inquires printer device information at step S203. If the controller 201 receives printer device information from the image forming apparatus 102 at step S204, it stores the received device information in part of the area of the second memory unit 205 at step S205. At step S206, the controller 201 creates a logical printer for the image forming apparatus 102 that is used in the OS of the controller 201 in order to transfer and print image data, thereby completing the printer search processing.

If NO at step S202 or S204, the controller 201 advances to step S207 to generate a predetermined warning using an image, sound, or sentence by the display unit 210, thereby completing the printer search processing.

[Print Processing]

Figure 6:
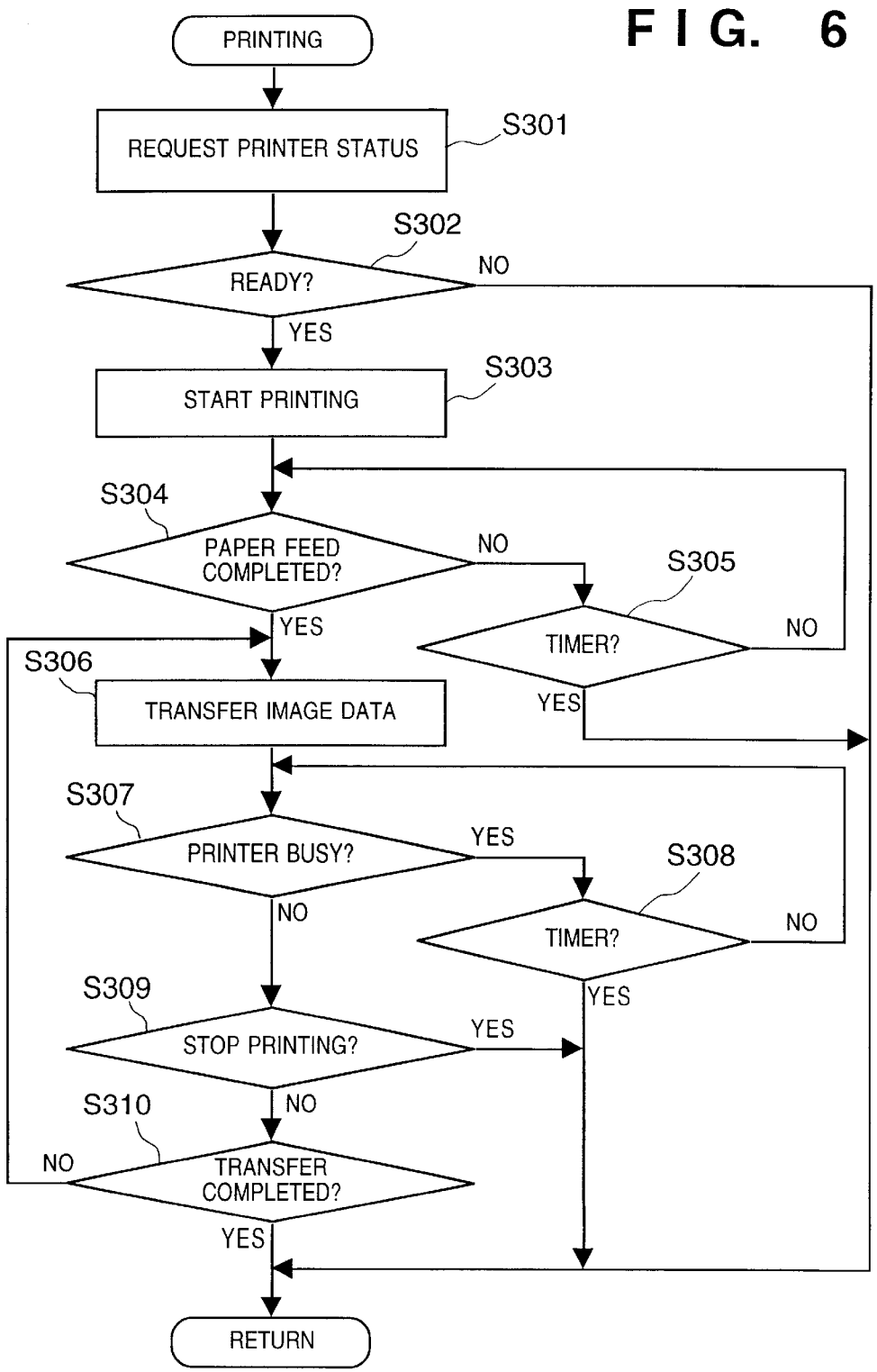
FIG. 6 is a flowchart showing the printing routine of he computer in the first embodiment.

FIG. 6 is a flowchart showing details of the print processing at step S112 of FIG. 4. In FIG. 6, at step S301, the controller 201 requests a target printer such as the image forming apparatus 102 to send printer status using the asynchronous transfer mode, by the high-speed serial communication unit 208 via the high-speed serial communication I/F 103. If the controller 201 receives at step S303 READY status representing that image data is ready to print from the image forming apparatus 102 at step S302, it sends a print start command to the image forming apparatus 102 using the asynchronous transfer mode.

At step S304, if the controller 201 receives a paper feed completion notification from the image forming apparatus 102 using the asynchronous transfer mode within a predetermined time determined by a timing (not shown) at step S305, it advances to step S306 to start transferring image data to the image forming apparatus 102 in the isochronous transfer mode using one or a plurality of channels obtained at step S109 in order to perform data transfer to which the data transfer period is guaranteed.

At step S307, if the controller 201 receives a printer busy notification from the image forming apparatus 102 using the asynchronous transfer mode during the transfer of image data in the isochronous transfer mode, it suspends the transfer of image data in the isochronous transfer mode within a predetermined time determined by the timer (not shown) at step S308. If the printer busy status continues even upon the lapse of the predetermined time, the controller 201 stops the print processing shown in FIG. 6. If the controller 201 receives a print stop input from the operation unit 214 at step S309, it stops the print processing. If the transfer of image data is not completed at step S310, the controller 201 returns to step S306 to repeat a series of processes. If YES at step S310, the controller 201 ends the print processing.

<<Print Operation in Image Forming Apparatus 102>>

Figure 7:
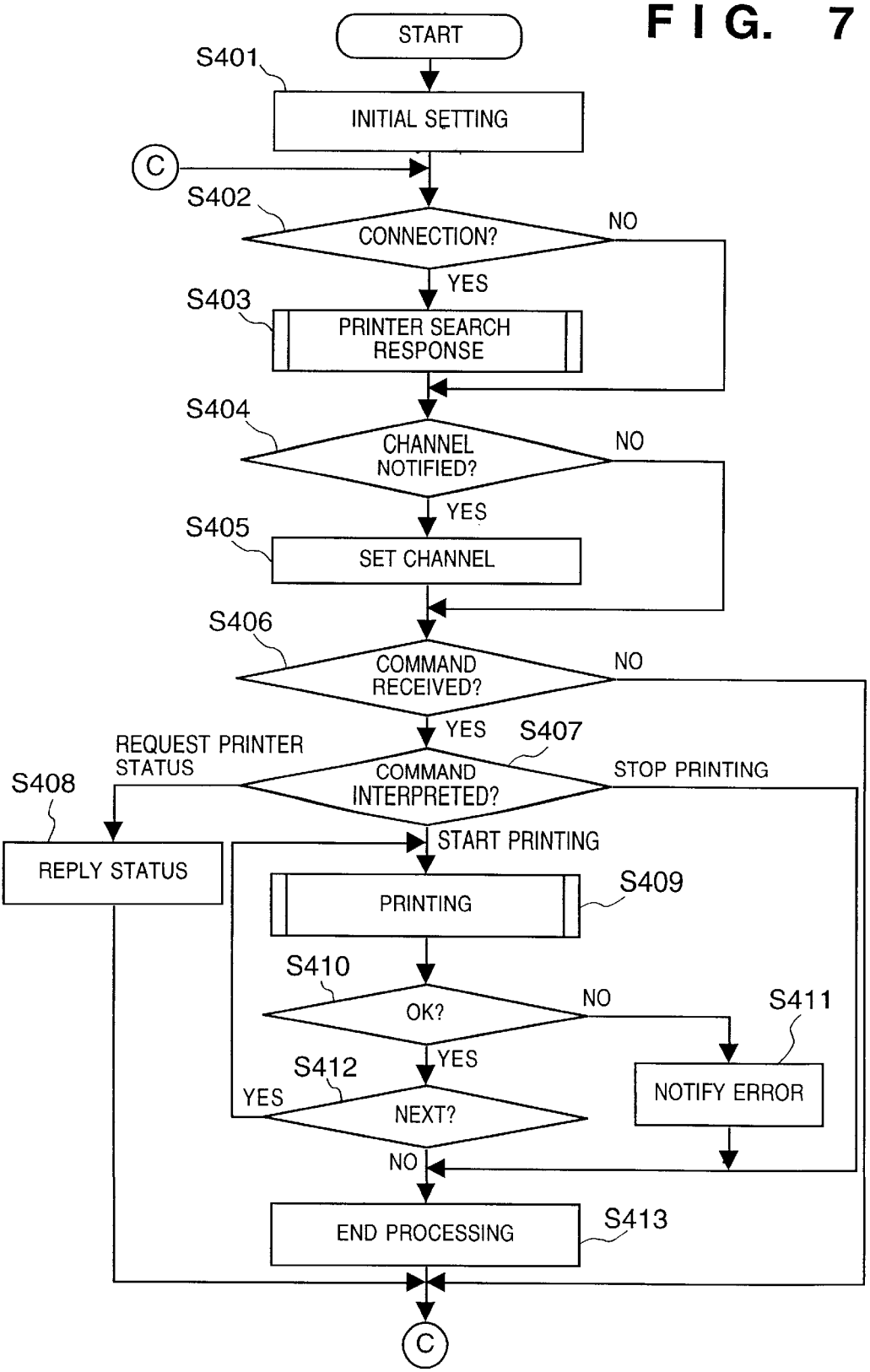
FIG. 7 is a flowchart showing the main routine of the image forming apparatus in the first embodiment.

FIG. 7 is a flowchart showing the main routine of the image forming apparatus 102 according to the first embodiment. Print operation in the image forming apparatus 102 will be explained with reference to FIG. 7.

At step S401, if the image forming apparatus 102 is turned on, the controller 301 initializes the flags, registers, control variables, and the like, executes a control program such as an OS stored in part of the area of the first memory unit 301, and initializes the respective units of the image forming apparatus 102. At step S402, the controller 301 checks whether or not a device including the image forming apparatus 102 is newly connected to the high-speed serial communication I/F 103. If YES at step S402, the controller 301 performs printer search response processing at step S403. Details of the printer search response processing at step S403 will be described with reference to the flowchart of FIG. 8.

If NO at step S402, the controller 301 advances to step S404. If the identification numbers of one or a plurality of channels which are obtained by the computer 101 and used in the isochronous transfer mode are notified at step S404 from the computer 101 via the high-speed serial communication I/F 103 using the asynchronous transfer mode, the controller 301 stores them in part of the area of the first memory unit 302 at step S405, and performs predetermined settings required to receive image data using the isochronous transfer mode. If NO at step S404, the controller 301 advances to step S406.

If the controller 301 receives a command from the computer 101 via the high-speed serial communication I/F 103 using the asynchronous transfer mode at step S406, it interprets the received command at step S407. If the command requests printer status, the controller 301 sends the status to the computer 101 using the asynchronous transfer mode at step S408, and returns to step S402. If the command is one notifying the print start at step S407, the controller 301 performs print processing at step S409. Details of the print processing will be described with reference to the flowchart of FIG. 9.

At step S410, if an error occurs in the print processing at step S409, the controller 301 notifies the computer 101 of the error status using the asynchronous transfer mode at step S411, performs predetermined stop processing necessary for the image forming apparatus 102 at step S413, and returns to step S402. If NO at step S410 and the controller 301 determines at step S412 that the next print operation must be subsequently executed, the controller 301 returns to step S409 to repeat a series of operations. If NO at step S412, the controller 301 performs predetermined end processing necessary for the image forming apparatus 102 at step S413, and returns to step S402.

[Printer Search Response Processing]

Figure 8:
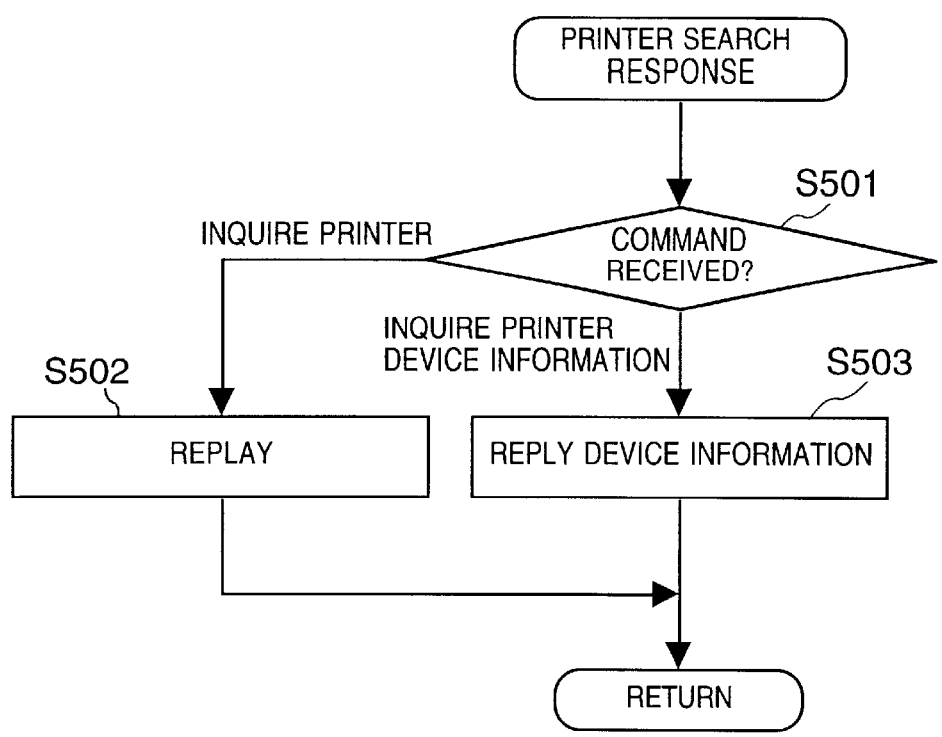
FIG. 8 is a flowchart showing the printer search response routine of the image forming apparatus in the first embodiment.

FIG. 8 is a flowchart showing details of the printer search response processing at step S403 of FIG. 7. In FIG. 8, if the controller 301 receives a command from the computer 101 via the high-speed serial communication I/F 103 using the asynchronous transfer mode at step S501, it interprets the received command. If the command is a printer inquiry command inquiring whether or not image data can be transferred from the computer 101 and printed, the controller 301 sends an OK reply to the computer 101 using the asynchronous transfer mode at step S502, thereby completing the printer search response processing.

If the command received at step S501 is one inquiring printer device information, the controller 301 sends printer device information to the computer 101 using the asynchronous transfer mode at step S503, thereby completing the printer search response processing.

[Print Processing]

Figure 9:
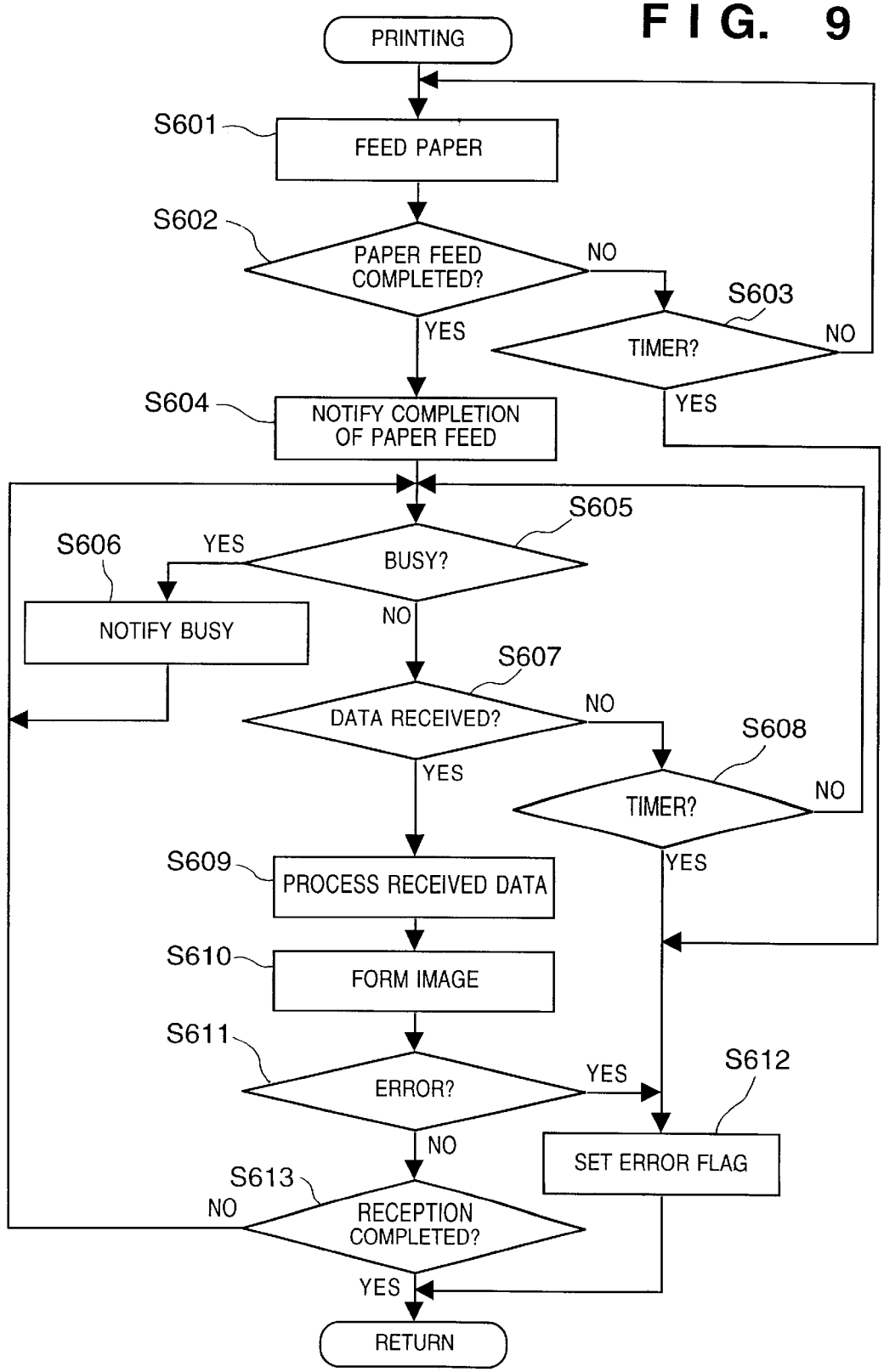
FIG. 9 is a flowchart showing the printing routine of the image forming apparatus in the first embodiment.

FIG. 9 is a flowchart showing details of the print processing at step S409 of FIG. 7. In FIG. 9, at step S601, the controller 301 performs paper feed processing of picking up and feeding a print sheet from the paper feed cassette 41 or 42 in order to sequentially convey the print sheet to the transfer portions 33, 34, 35, and 36 of the image forming apparatus 102. The leading end of the fed print sheet is aligned by a registration roller before the first transfer portion 33. At this time, the completion of paper feed is detected by a paper detector and notified to the controller 301. At step S602, if the controller 301 receives the paper feed completion notification within a predetermined time determined by the timer (not shown) at step S603, it advances to step S604 to send the paper feed completion notification to the computer 101 via the high-speed serial communication I/F 103 using the asynchronous transfer mode. If NO at step S602, the controller 301 advances to step S612 to set an error flag, and completes the print processing.

At step S605, if the controller 301 is in busy status in which no data can be received, it notifies of the computer 101 the busy status using the asynchronous transfer mode at step S606, and returns to step S605. If the computer 101 starts transmitting image data in the isochronous transfer mode within a predetermined time determined by the timer (not shown) at step S608, the controller 301 starts receiving the image data by the high-speed serial communication unit 308 at step S607. This image data reception is done via the high-speed serial communication I/F 103, high-speed serial communication connector 309, and high-speed serial communication unit 308 using one or a plurality of channels obtained by the computer 101 ignorer to perform data transfer to which the data transfer period is guaranteed. As described above, prior to the start of data reception, the controller 301 receives at step S404 of FIG. 7 the identification numbers of one or a plurality of channels notified from the computer 101, and performs predetermined setting necessary for data reception in the isochronous transfer mode at step S405.

At step S609, the controller 301 sends received Y (Yellow) image data from the high-speed serial communication unit 308 to the image processing unit 331, received M (Magenta) image data from the high-speed serial communication unit 308 to the image processing unit 332 via the delay memory 322, received C (Cyan) image data from the high-speed serial communication unit 308 to the image processing unit 333 via the delay memory 323, and received K (blacK) image data from the high-speed serial communication unit 308 to the image processing unit 334 via the delay memory 324. The image processing units 331, 332, 333, and 334 perform predetermined image processing for the received image data. As described above, the delay memories are used to correct the print timings in accordance with respective drum intervals in printing while sequentially conveying the print sheet to the four photosensitive drums.

At step S610, the controller 301 sends the processed Y image data from the image processing unit 331 to the image forming unit 341, the processed M image data from the image processing unit 332 to the image forming unit 342, the processed C image data from the image processing unit 333 to the image forming unit 343, and the processed K image data from the image processing unit 334 to the image forming unit 344. The image processing units 331, 332, 333, and 334 form images. If an error such as jam occurs in image formation at step S611, the controller 301 sets an error flag at step S612 to complete the print processing shown in FIG. 9. If the controller 301 continuously receives image data at step S613, it returns to step S605 to repeat a series of processes. If the controller 301 has received image data at step S613, it completes the print processing shown in FIG. 9.

Figure 10:
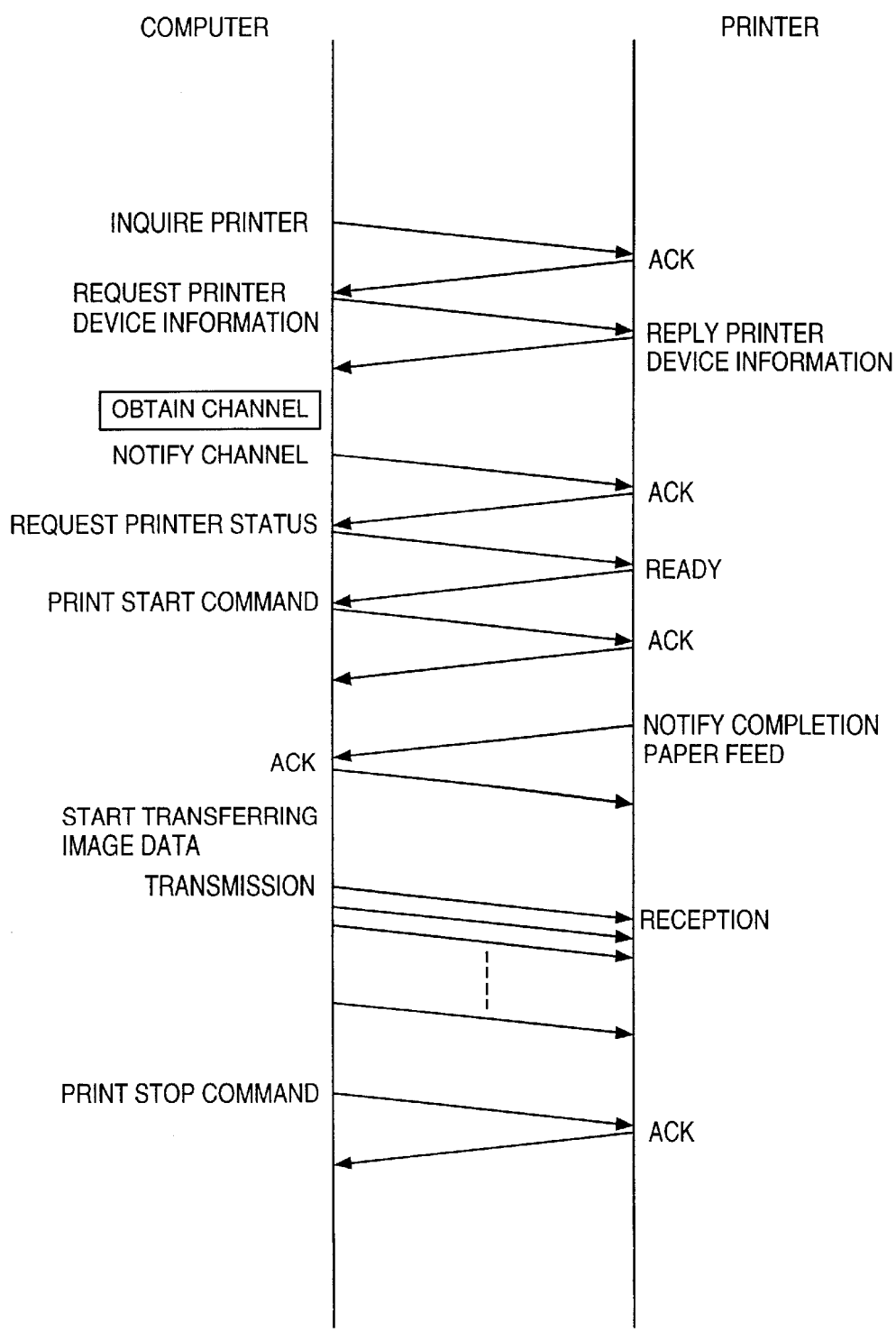
FIG. 10 is a view showing the flow of commands transmitted/received between the computer and image forming apparatus in the first embodiment.

The computer 101 and image forming apparatus 102 (printer) in the first embodiment communicate with each other in the above-described manner to print a color image. FIG. 10 shows the flow of commands and image data exchanged between the computer 101 and printer 102 that is described in this embodiment. More specifically, the computer 101 ensures a channel for isochronous transfer on the high-speed serial communication I/F 103 on the basis of information replied from the printer 102 in accordance with a printer device information request command, and transfers image data using the channel.

According to the first embodiment, the image processing system constituted by connecting the computer to the color image forming apparatus having a plurality of photosensitive drums ensures a channel for isochronous transfer to isochronously transfer image data using the channel. Thus, the image forming apparatus can appropriately form a color image at a high speed with only a small-capacity delay memory without using any large-capacity image memory for temporarily storing transferred image data in order to correct the time difference required for the print sheet to reach each photosensitive drum.

Second Embodiment

The second embodiment according to the present invention will be described below.

An image processing system in the second embodiment is constituted by connecting a computer 101 and image forming apparatus 102 via a high-speed serial communication I/F 103, similar to the system in the first embodiment shown in FIG. 1.

The detailed construction of the computer 101 in the second embodiment is the same as in the first embodiment shown in FIG. 2, and a detailed description thereof will be omitted.

<<Detailed Construction of Image Forming Apparatus 102>>

The detailed construction of the image forming apparatus 102 in the second embodiment will be explained with reference to the functional block diagram shown in FIG. 11.

Figure 11:
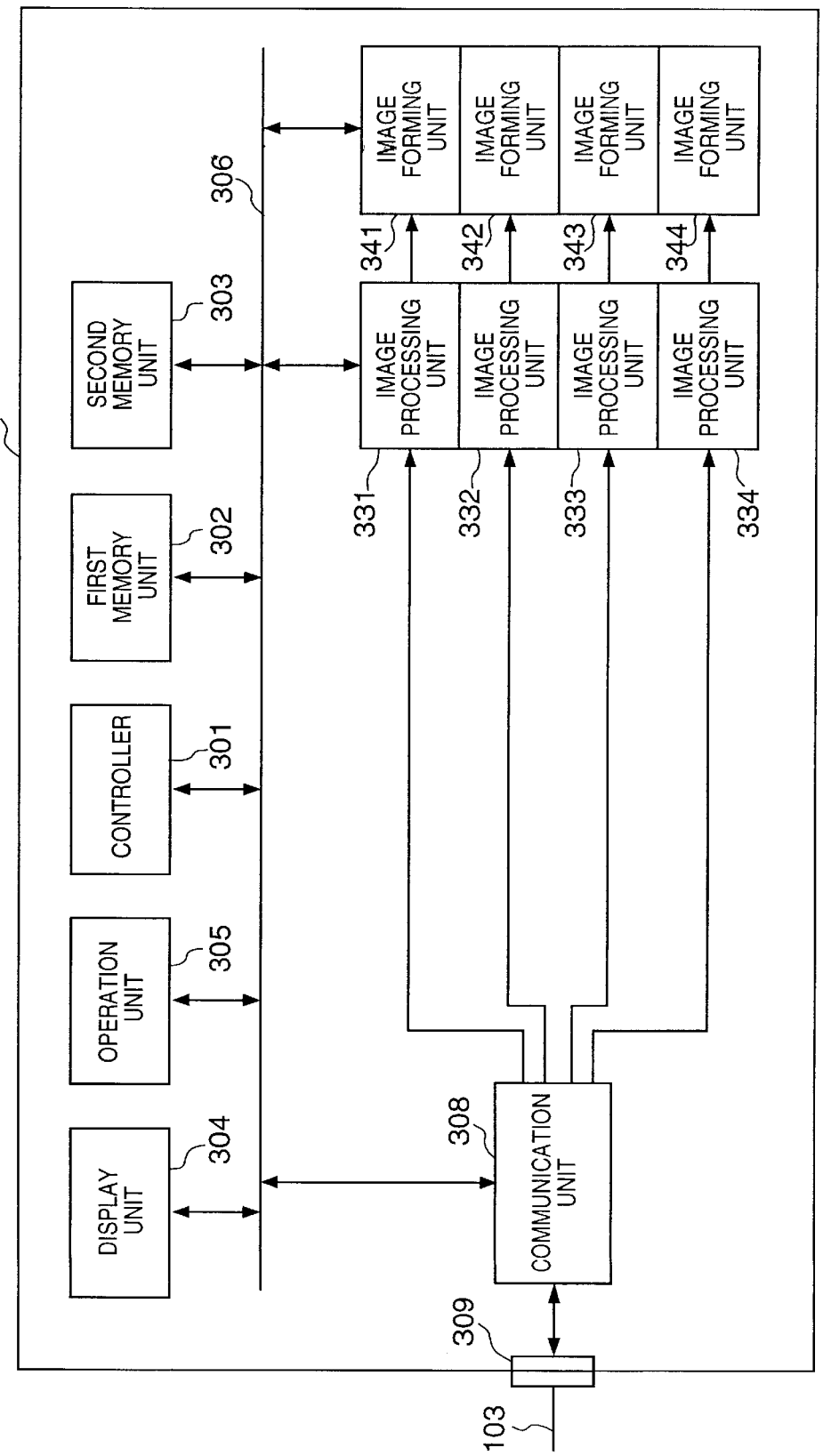
FIG. 11 is a block diagram showing the functional construction of an image forming apparatus in the second embodiment.

In FIG. 11, the drum interval correction delay memories 322, 323, and 324 are omitted from the construction of the first embodiment shown in FIG. 3. The remaining construction is the same as in FIG. 3, and a description thereof will be omitted.

Print operation in the image processing system of the second embodiment will be explained in detail.

<<Print Operation in Computer 101>>

Print processing in the computer 101 of the second embodiment is almost the same as processing of the first embodiment shown in the flowchart of FIG. 4, and only the difference from processing in the first embodiment will be described.

After initial setting at step S101 of FIG. 4, a controller 201 checks connection of a new device at step S102. If YES at step S102, the controller 201 advances to step S103 to perform printer search processing. The printer search processing at step S103 will be explained in detail below but is almost the same as processing of the first embodiment shown in the flowchart of FIG. 5.

The controller 201 checks a key input from an operation unit 214 at steps S104 and S107. At step S107, if the input from the operation unit 214 is one for printing an open image file, the controller 201 advances to step S109 to obtain channels to which a data transfer period such as the isochronous transfer mode is guaranteed on the high-speed serial communication I/F 103, by a high-speed serial communication unit 208 in accordance with the number of photosensitive drums. At step S111, the controller 201 notifies the image forming apparatus 102 of the identification numbers of the plurality of obtained channels by one-to-one asynchronous transfer via the high-speed serial communication unit 208, high-speed serial communication connector 209, and high-speed serial communication I/F 103.

Figure 15:
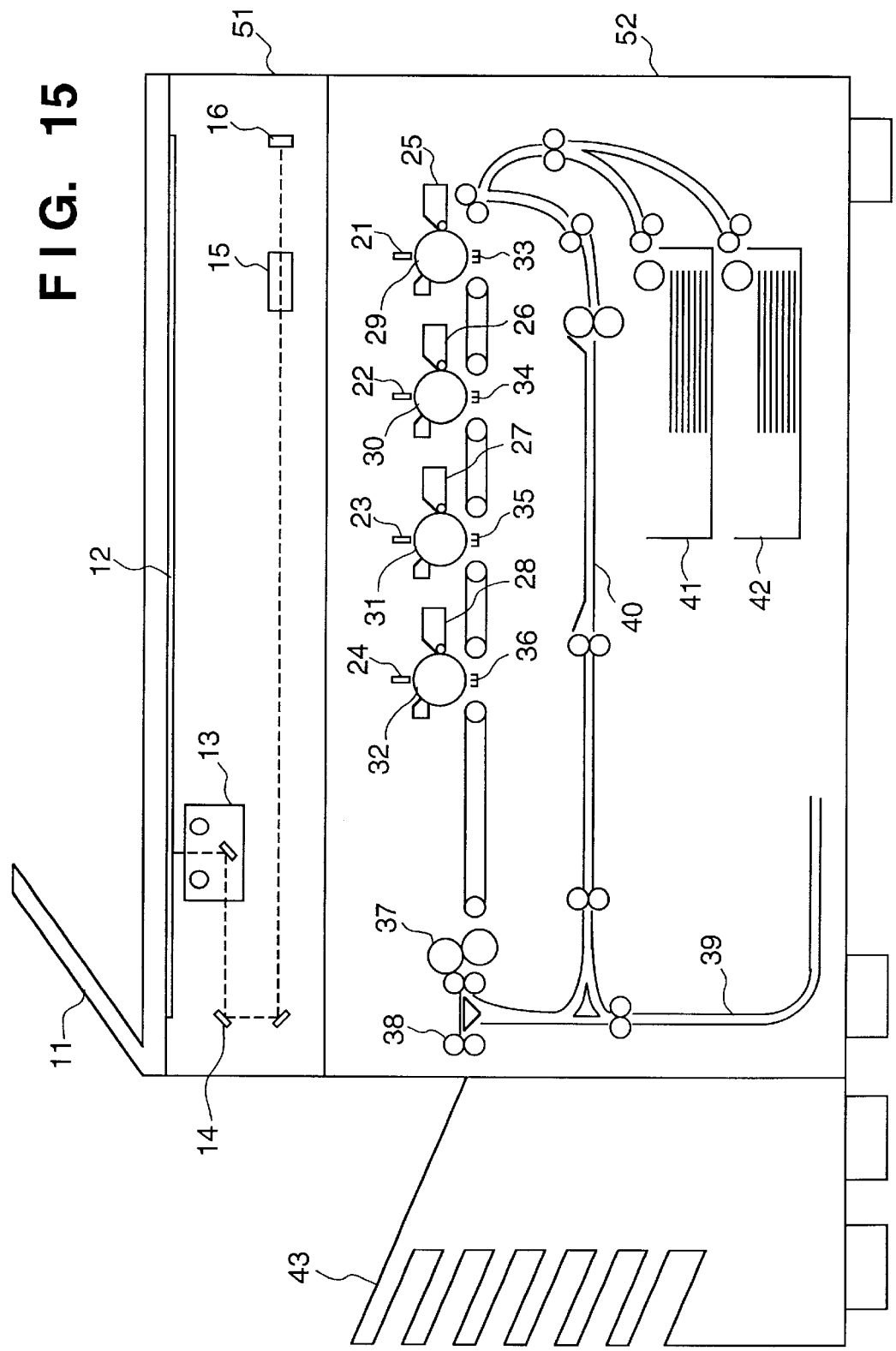
FIG. 15 is a sectional side view showing the structure of the image forming apparatus.

In this case, the second embodiment transfers image data using the isochronous transfer mode to the image forming apparatus 102 having a mechanism of forming an image using four, Y, M, C, and K photosensitive drums, like the one shown in FIG. 15. For this purpose, the controller 201 obtains channels for the four, Y, M, C, and K colors to notify the image forming apparatus of the obtained channels for the four colors. This allows transferring image data while delaying the start of transfer of image data at the timing of correcting the drum interval for each channel.

At step S112, the controller 201 transfers image data to the image forming apparatus 102 using the channels obtained for the four, Y, M, C, and K colors that are notified to the image forming apparatus 102, and the image forming apparatus 102 performs print processing of printing the image data. Details of the print processing at step S112 will be described with reference to the flowchart of FIG. 12.

Processing at step S113 and subsequent steps in FIG. 4 is the same as in the first embodiment, and a description thereof will be omitted.

[Printer Search Processing]

The printer search processing at step S103 in the second embodiment is almost the same as processing in the first embodiment shown in the flowchart of FIG. 5, and only the difference from processing in the first embodiment will be explained.

Similar to the first embodiment, the controller 201 stores at step S205 device information replied in accordance with a printer device information inquiry at step S203 of FIG. 5. The replied device information in the second embodiment is device information that the image forming apparatus 102 having the four, Y, M, C, and K photosensitive drums, like the one shown in FIG. 15, does not comprise any drum interval correction delay memory, as shown in FIG. 11. Thus, in transferring image data using the isochronous transfer mode, the controller 201 can determine that channels must be obtained for the four, Y, M, C, and K colors to delay the start of transfer of image data at the timing of correcting the drum interval for each channel.

Processing at step S206 and subsequent steps in FIG. 5 is the same as in the first embodiment, and a description thereof will be omitted.

[Print Processing]

Figure 12:
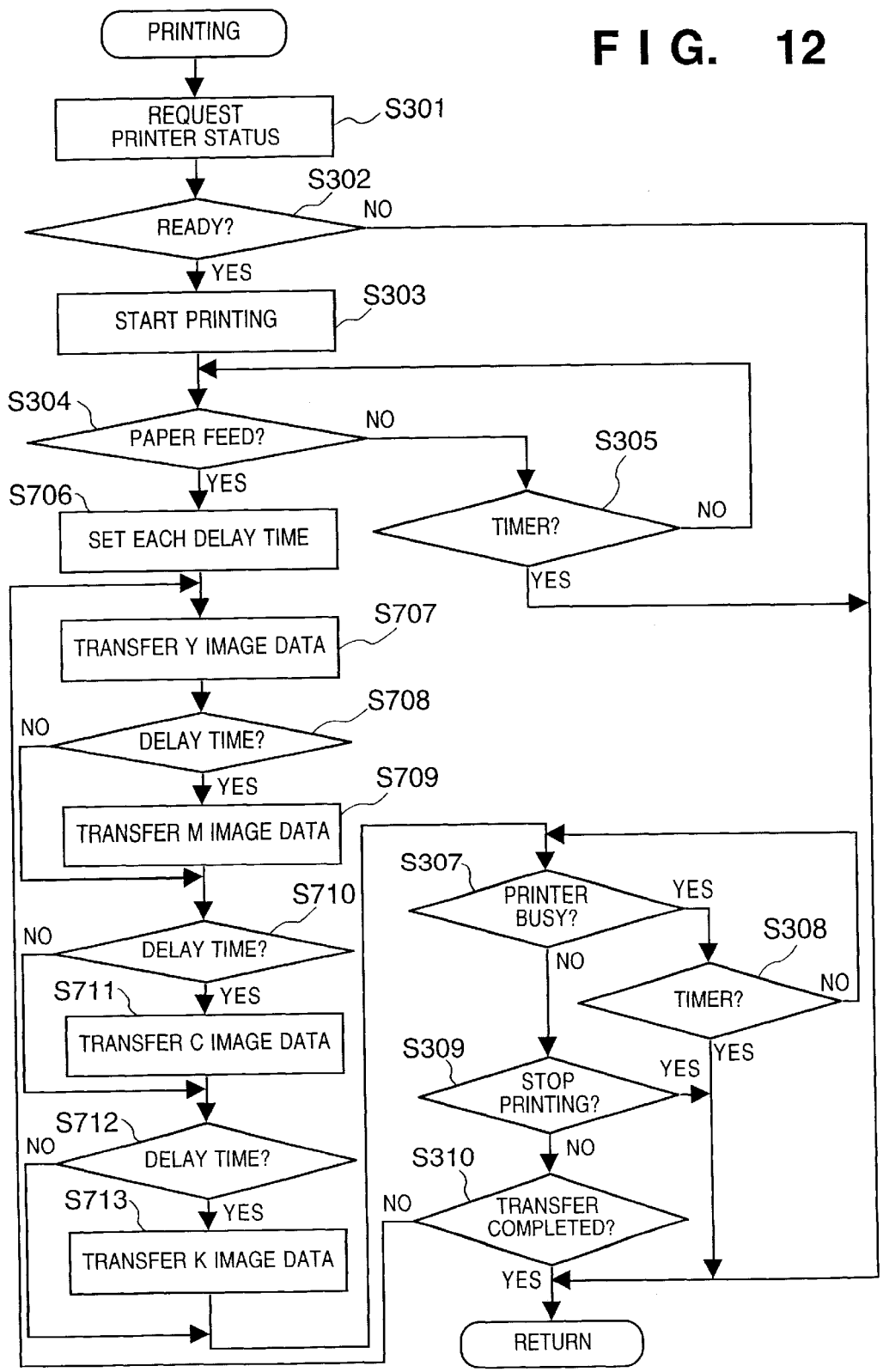
FIG. 12 is a flowchart showing the printing routine of a computer in the second embodiment.

FIG. 12 is a flowchart showing detailed print processing at step S112 of FIG. 4. In FIG. 12, the same reference numbers as in the first embodiment shown in FIG. 6 denote the same processing steps, and a description thereof will be omitted.

In FIG. 12, if the controller 201 receives a paper feed completion notification from the image forming apparatus 102 at step S304, it sets respective transfer start delay times for correcting respective drum intervals at step S706 in order to transfer data while delaying the start of transfer of image data at the timing of correcting the drum interval. The set delay time is calculated by the controller 201 on the basis of printer device information unique to the image forming apparatus 102 that has been received at step S205 of FIG. 5, the data transfer speed of the isochronous transfer mode, and the like. The printer device information includes the number of photosensitive drums, the type of image formation color, the distance between photosensitive drums, the image formation speed, and the like. In this way, the transfer start delay time for each color is set at step S706 in order to correct the interval between photosensitive drums, i.e., to correct the time difference generated to sequentially convey the print sheet to the respective photosensitive drums, and the transfer times of image data of the respective colors.

At step S707, the controller 201 starts transferring Y image data to the image forming apparatus 102 in the isochronous transfer mode using the Y channel out of a plurality of channels obtained for the four, Y, M, C, and K colors in order to perform data transfer to which the data transfer period is guaranteed at step S109 of FIG. 4.

At step S708, if the transfer start delay time between the Y and M photosensitive drums set at step S706 has elapsed, the controller 201 advances to step S709 to start transferring M image data to the image forming apparatus 102 in the isochronous transfer mode. At step S710, if the transfer start delay time between the Y and C photosensitive drums set at step S706 has elapsed, the controller 201 advances to step S711 to start transferring C image data to the image forming apparatus 102 in the isochronous transfer mode. At step S712, if the transfer start delay time between the Y and K photosensitive drums set at step S706 has elapsed, the controller 201 advances to step S713 to start transferring K image data to the image forming apparatus 102 in the isochronous transfer mode.

Subsequent processing in FIG. 12 is the same as in the first embodiment shown in FIG. 6, and a description thereof will be omitted.

<<Print Operation in Image Forming Apparatus 102>>

Print processing in the image forming apparatus 102 of the second embodiment is almost the same as processing of the first embodiment shown in the flowchart of FIG. 7, and only the difference from processing in the first embodiment will be described.

After initial setting at step S401 of FIG. 7, a controller 301 checks connection of a new device at step S402. If YES at step S402, the controller 301 advances to step S403 to perform printer search response processing. In the printer search response processing at step S403, the controller 301 notifies the computer 101 of device information corresponding to the device construction of the image forming apparatus 102, thus realizing optimum settings required to transfer image data using the isochronous transfer mode in the computer 101. In the second embodiment, since the image forming apparatus 102 comprises the four, Y, M, C, and K photosensitive drums like the ones shown in FIG. 15 but no drum interval correction delay memory, as shown in FIG. 11, the controller 301 replies to the computer 101 device information including the number of photosensitive drums, the type of image formation color, the distance between photosensitive drums, the image formation speed, and the like. Then, in transferring image data using the isochronous transfer mode, the computer 101 can obtain channels necessary for the four, Y, M, C, and K colors to transfer the data while delaying the start of transfer of image data at the timing of correcting the drum interval for each channel.

The printer search response processing at step S403 will be explained in detail below but is almost the same as processing of the first embodiment shown in the flowchart of FIG. 8.

If the identification numbers of a plurality of channels obtained by the computer 101 for the four, Y, M, C, and K colors used in the isochronous transfer mode are notified from the computer 101 via the high-speed serial communication I/F 103 using the asynchronous transfer mode at step S404, the controller 301 stores them in part of the area of a first memory unit 302, and performs predetermined settings required to receive image data using the isochronous transfer mode at step S405.

If a command received at step S406 is one notifying the print start at step S407, the controller 301 advances to step S409 to transfer data while delaying the start of transfer of image data at the timing of correcting the drum interval for each channel, and performs print processing of forming an image on the photosensitive drum of each color. Details of the print processing will be described with reference to the flowcharts of FIGS. 13A and 13B.

Processing at step S410 and subsequent steps in FIG. 7 is the same as in the first embodiment, and a description thereof will be omitted.

[Printer Search Response Processing]

The printer search response processing at step S403 in the second embodiment is almost the same as processing in the first embodiment shown in the flowchart of FIG. 8, and only the difference from processing in the first embodiment will be explained.

Similar to the first embodiment, the controller 301 replies device information at step S503 in accordance with a printer device information inquiry received at step S501 of FIG. 8. The image forming apparatus 102 in the second embodiment comprises the four, Y, M, C, and K photosensitive drums like the ones shown in FIG. 15, but no drum interval correction delay memory, as shown in FIG. 11. Therefore, the controller 301 replies to the computer 101 device information such as the number of photosensitive drums, the type of image formation color, the distance between photosensitive drums, and the image formation speed. Then, in transferring image data using the isochronous transfer mode, the computer 101 can obtain channels necessary for the four, Y, M, C, and K colors to transfer the data while delaying the start of transfer of image data at the timing of correcting the drum interval for each channel.

[Print Processing]

Figure 13A:
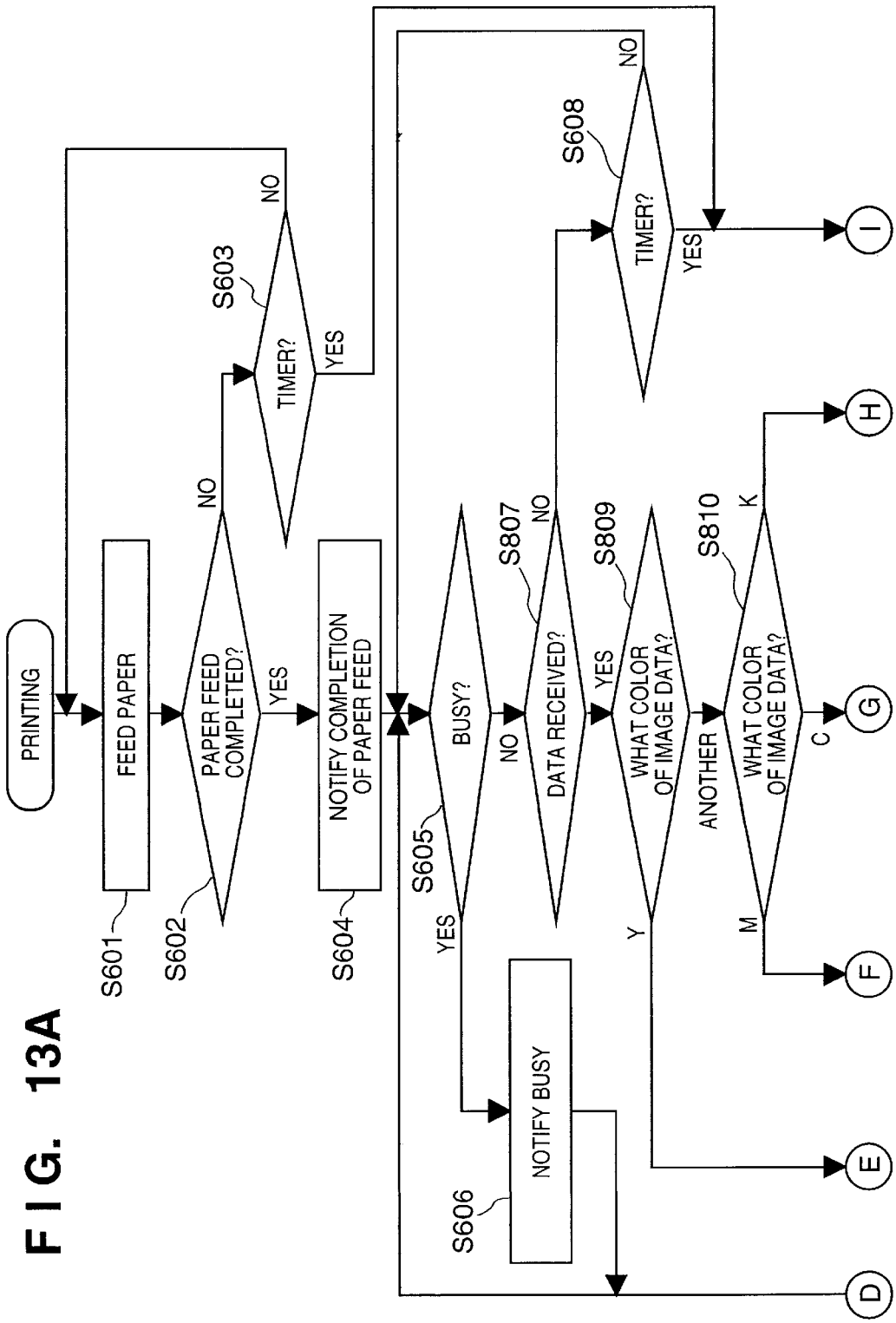

FIGS. 13A and 13B are flowcharts showing detailed print processing at step S409 of FIG. 7. In FIGS. 13A and 13B, the same reference numbers as in the first embodiment shown in FIG. 9 denote the same processing steps, and a description thereof will be omitted.

At step S807 of FIG. 13A, the controller 301 starts receiving image data by the high-speed serial communication unit 308. This image data reception is done via the high-speed serial communication I/F 103, high-speed serial communication connector 309, and high-speed serial communication unit 308 using a plurality of channels obtained by the computer 101 for the four, Y, M, C, and K colors in order to perform data transfer to which the data transfer period is guaranteed. As described above, prior to the start of data reception, the controller 301 receives at step S404 of FIG. 7 the identification numbers of a plurality of channels for the four, Y, M, C, and K colors that are notified from the computer 101, and performs predetermined setting required to receive data of the Y, M, C, and K colors in the isochronous transfer mode at step S405.

At this time, in transmitting image data from the computer 101 in the isochronous transfer mode, the controller 301 delays the start of transfer of image data at the timing of correcting the photosensitive drum interval for the respective channels of the four, Y, M, C, and K colors. Accordingly, even if the image forming apparatus 102 does not comprise any delay memory for correcting the developing drum interval, image data of the four, Y, M, C, and K colors can be sequentially received to form a color image from accurately overlapped color plates.

The controller 301 advances to step S809, and if Y image data is received from the Y channel in the isochronous transfer mode, sends at step S811 the received Y image data from the high-speed serial communication unit 308 to the image processing unit 331 where predetermined image processing is done for the sent Y image data. After that, the image forming unit 341 forms an image at step S812.

Similarly, if M image data is received from the M channel in the isochronous transfer mode at steps S809 and S810, it is subjected to image processing in the image processing unit 332 and image formation in the image forming unit 342 at steps S813 and S814.

If C image data is received from the C channel in the isochronous transfer mode at steps S809 and S810, it is subjected to image processing in the image processing unit 333 and image formation in the image forming unit 343 at steps S815 and S816.

If K image data is received from the K channel in the isochronous transfer mode at steps S809 and S810, it is subjected to image processing in the image processing unit 334 and image formation in the image forming unit 344 at steps S817 and S818.

Subsequent processing in FIG. 13B is same as in the first embodiment shown in FIG. 9, and a description thereof will be omitted.

Figure 14:
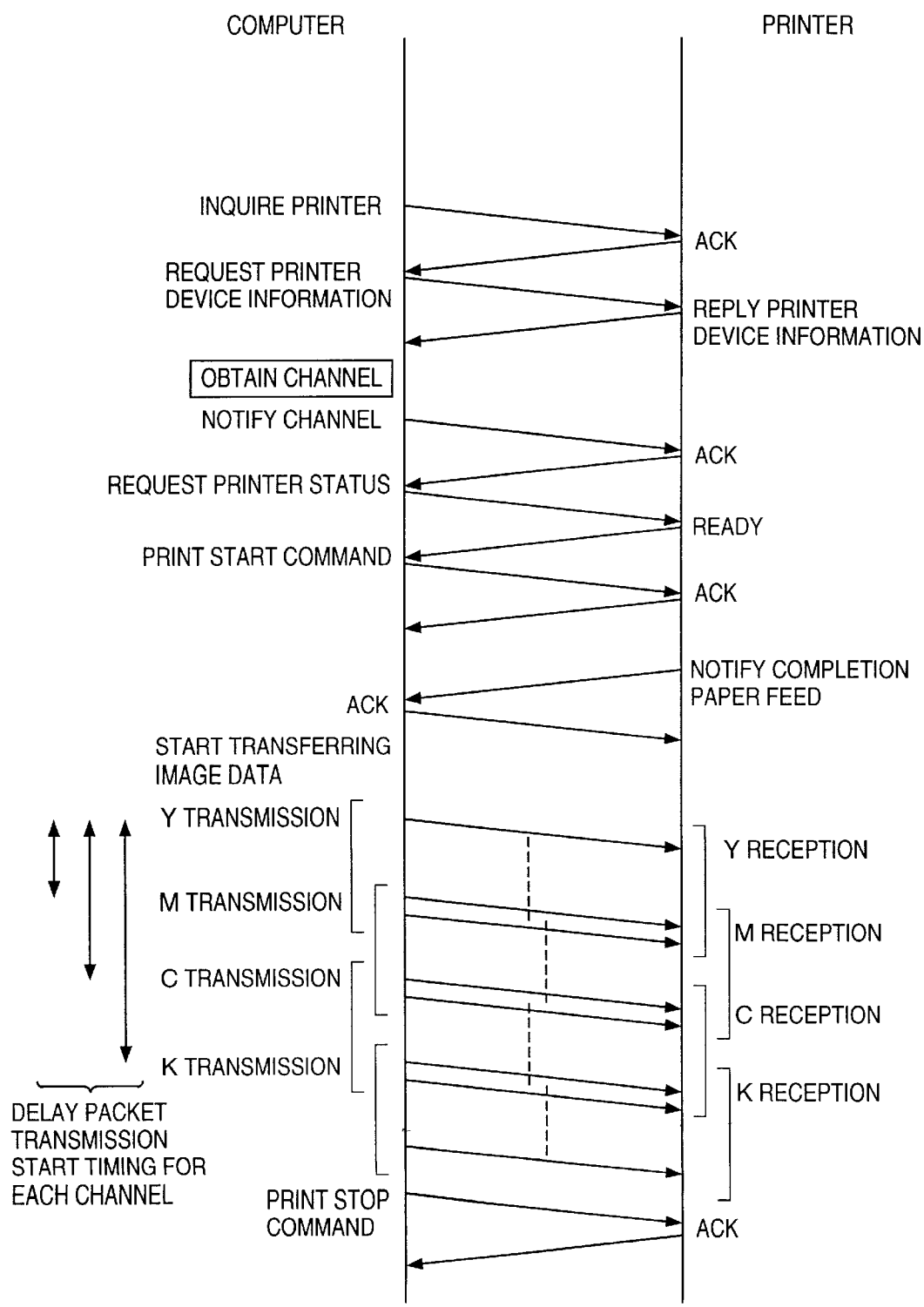
FIG. 14 is a view showing the flow of commands transmitted/received between the computer and image forming apparatus in the second embodiment.

The computer 101 and image forming apparatus 102 (printer) in the second embodiment communicate with each other in the above-described manner to print a color image. FIG. 14 shows the flow of commands and image data exchanged between the computer 101 and printer 102 that is described in this embodiment. More specifically, the computer 101 ensures an isochronous transfer channel for each color on the high-speed serial communication I/F 103, and transfers image data of each color while delaying the start of transfer at the timing of correcting the drum interval. According to the second embodiment, the image processing system constituted by connecting the computer to the color image forming apparatus having a plurality of photosensitive drums ensures an isochronous transfer channel for each color and controls the transfer start time for each color using the channel. As a result, the image forming apparatus can correct the time difference required for the print sheet to reach each photosensitive drum to appropriately form a color image at a high speed without using any large-capacity image memory for temporarily storing transferred image data and any delay memory.

Note that in the first and second embodiments, one computer 101 and one image forming apparatus 102 are connected to the high-speed serial communication I/F 103. However, any combination of one or a plurality of computers and one or a plurality of image forming apparatuses may be adopted. In addition, one or a plurality of devices other than the computer 101 and image forming apparatus 102 may be connected to the high-speed serial communication I/F 103.

In the first and second embodiments, the image forming apparatus 102 comprises the four, Y, M, C, and K photosensitive drums. However, any combination of photosensitive drums different in color, number, and order from the above ones may be adopted so long as the print sheet is sequentially conveyed to a plurality of photosensitive drums and thus the supply time of image data of each color must be corrected in correspondence with the time different required for the print sheet to reach each photosensitive drum.

In the second embodiment, if the set transfer start delay time between the Y and M developing drums has elapsed after transfer of Y image data starts, transfer of M image data starts. If the set transfer start delay time between the Y and C developing drums has elapsed, transfer of C image data starts. If the set transfer start delay time between the Y and K developing drums has elapsed, transfer of K image data starts. Instead, the transfer start timing of each color data may be set by another method as far as the supply time of image data of each color can be corrected in correspondence with the time difference required for the print sheet to reach each photosensitive drum. For example, the time difference may be corrected by the following method. If the set transfer start delay time between the Y and M developing drums has elapsed after transfer of Y image data starts, transfer of M image data starts. If the set transfer start delay time between the M and C developing drums has elapsed, transfer of C image data starts. If the set transfer start delay time between the C and K developing drums has elapsed, transfer of K image data starts.

In the above embodiments, image data is transferred from the computer 101 to the image forming apparatus 102. Alternatively, image data may be temporarily transferred from the computer to the server, and then transferred from the server to the image forming apparatus. Also, a command instructing image formation may be transferred from the computer to the server, and then image data maybe transferred from the server to the image forming apparatus. In these cases, a series of processes done between the computer and image forming apparatus in the above embodiments are realized between the server and image forming apparatus.

The image forming apparatus in each embodiment described above comprises the image forming unit using the photosensitive drum. However, the image forming apparatus may comprise another image forming unit using another mechanism as long as the unit has a device construction in which the print sheet is sequentially conveyed to the image forming means of respective colors, and the supply time of image data of each color must be corrected in correspondence with the time difference required for the print sheet to reach the image forming means of each color.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment/embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the foregoing embodiment.

When the present invention is applied to the storage medium, the storage medium stores program codes corresponding to the above-mentioned flow-chart(FIGS. 4–9, 12,13A and 13B).

As many apparently widely different embodiments of the present invention can be made without departing from the spirit and scope thereof, it is to be understood that the invention is not limited to the specific embodiments thereof except as defined in the appended claims.

What is claimed is:

1. An image processing system connecting an image processing apparatus and an image forming apparatus by a serial bus,
  said image processing apparatus comprising:
    determination means for determining whether the image forming apparatus comprises a drum interval correction delay memory;
    control means for controlling to delay the start of transfer of a plurality of types of image data at the timing of correcting the drum interval if the image forming apparatus does not comprise a drum interval correction delay memory; and
    first communication means for isochronously transferring the delayed plurality of types of image data via said serial bus, and
  said image forming apparatus comprising:

second communication means for receiving the plurality of types of image data isochronously transferred via said serial bus; and a plurality of image forming means for forming images on a print medium on the basis of the plurality of types of image data.

2. The system according to claim 1, wherein said control means changes a delay amount for each type of image data.

3. The system according to claim 2, wherein said control means delays each of the plurality of types of image data in accordance with a time required to move the print medium between said plurality of image forming means.

4. The system according to claim 1, wherein the plurality of types of image data are image data of a plurality of colors, and each of said plurality of image forming means forms image data of each color into an image.

5. The system according to claim 1, wherein isochronous transfer in said first and second communication means is a communication mode capable of ensuring a data transfer rate.

6. The system according to claim 5, wherein the isochronous transfer is a communication mode of ensuring a channel to which the data transfer rate is guaranteed and broadcasting image data divided into data packets by the channel.

7. The system according to claim 6, wherein said first communication means ensures channels in accordance with the number of image forming means.

8. The system according to claim 7, wherein said first communication means notifies said second communication means by asynchronous transfer of the channel ensured to isochronously transfer image data.

9. The system according to claim 8, wherein said first communication means asynchronously transfers an image formation start command to said second communication means, and said second communication means receives the image formation start command to asynchronously transfer to said first communication means that said image forming apparatus is ready to start image formation.

10. The system according to claim 9, wherein, when the print medium is conveyed to said image forming means, said second communication means asynchronously transfers to said first communication means that image formation is ready to start.

11. The system according to claim 1, wherein said second communication means notifies said first communication means by asynchronous transfer of delay information of the plurality of types of image data.

12. The system according to claim 11, wherein said control means delays each of the plurality of types of image data on the basis of the delay information asynchronously transferred to said first communication means.

13. The system according to claim 12, wherein the delay information is time information required to move the print medium between said plurality of image forming means.

14. The system according to claim 12, wherein the delay information is device construction information in said plurality of image forming means.

15. The system according to claim 11, wherein the asynchronous transfer is a communication mode capable of performing one-to-one data transfer designating a transfer destination.

16. The system according to claim 1, wherein said serial bus is a bus conformity with the IEEE 1394 standard.

17. The system according to claim 1, wherein said serial bus is a bus conformity with the USB standard.

18. An image processing method for use in an image processing system constituted by connecting an image forming apparatus having a plurality of image forming means to an image processing apparatus by a serial bus, said method comprising the steps of:

determining whether the image forming apparatus comprises a drum interval correction delay memory;

delaying each start of transfer of a plurality of types of image data in the image processing apparatus at the timing of correcting the drum interval if the image forming apparatus does not comprise a drum interval correction delay memory;

isochronously transferring the delayed plurality of types of image data from the image processing apparatus to the image forming apparatus via the serial bus;

receiving the plurality of types of image data isochronously transferred via the serial bus in image forming apparatus; and forming images on a print medium by the plurality of image forming means on the basis of the plurality of types of image data.

19. The method according to claim 18, wherein said delay step comprises delaying each of the plurality of types of image data in accordance with a time required to move the print medium between the plurality of image forming means.

20. A recording medium comprising program codes of an image processing method for use in an image processing system constituted by connecting an image forming apparatus having a plurality of image forming means to an image processing apparatus by a serial bus, the program codes include at least:

a code for determining whether the image forming apparatus comprises a drum interval correction delay memory;

a code for delaying each start of transfer of a plurality of types of image data in the image processing apparatus at the timing of correcting the drum interval if the image forming apparatus does not comprise a drum interval correction delay memory;

a code for isochronously transferring the delayed plurality of types of image data from the image processing apparatus to the image forming apparatus via the serial bus;

a code for receiving the plurality of types of image data isochronously transferred via the serial bus in image forming apparatus; and a code for forming images on a print medium by the plurality of image forming means on the basis of the plurality of types of image data.

21. An image processing apparatus which can connect with an image forming apparatus by a serial bus, said image processing apparatus comprising:

determination means for determining whether the image forming apparatus comprises a drum interval correction delay memory;

control means for controlling to delay the start of transfer of a plurality of types of image data at the timing of correcting the drum interval if the image forming apparatus does not comprise a drum interval correction delay memory;

first communication means for isochronously transferring the delayed plurality of types of image data to the image forming apparatus via the serial bus; and second communication means for isochronously transferring a plurality of types of image data to the image forming apparatus via the serial bus if the image forming apparatus comprises the drum interval correction delay memory.

* * * * *

UNITED STATES PATENT AND TRADEMARK OFFICE
CERTIFICATE OF CORRECTION

PATENT NO. : 7,196,713 B1
APPLICATION NO. : 09/328469
DATED : March 27, 2007
INVENTOR(S) : Yoichi Yamagishi It is certified that error appears in the above-identified patent and that said Letters Patent is hereby corrected as shown below:

COLUMN 3

Line 24, "he" should read --the--.
Line 51, "an" should read --a--.
Line 55, "showing" should read --showing the--.

COLUMN 4

Line 58, "bus," should read --bus, and--.
Line 63, "realtime" should read --real-time--.

COLUMN 5

Line 4, "realtime" should read --real-time--.
Line 24, "bus," should read --bus, and--.
Line 43, "an" should read --a--.
Line 51, "detail. <<Details" should read --detail. ¶<<Details--.

COLUMN 6

Line 35, "leave" should read --leaf--.
Line 36, "leave" should read --leaf--.
Line 58, "of-parent-child" should read --of parent-child--.
Line 64, "is" should read --does--.

COLUMN 7

Line 34, "single or" should read --single node or a--.

COLUMN 8

Line 12, "or" should read --or a--.
Line 16, "nodes" should read --nodes that--.
Line 28, "an" should read --a--.
Line 40, "mode" should read --modes--; and "1934" should read --1394--.
Line 48, "of" should read --of a--.

UNITED STATES PATENT AND TRADEMARK OFFICE
CERTIFICATE OF CORRECTION

| | |
|---|---|
| PATENT NO. | : 7,196,713 B1 |
| APPLICATION NO. | : 09/328469 |
| DATED | : March 27, 2007 |
| INVENTOR(S) | : Yoichi Yamagishi |

It is certified that error appears in the above-identified patent and that said Letters Patent is hereby corrected as shown below:

COLUMN 9

Line 3, "1934" should read --1394--.
    Line 6, "realtime" should read --real-time--.
    Line 25, "substantially-" should read --substantially--.
    Line 26, "realtime" should read --real-time--.
    Line 44, "bur" should read --bus--.

COLUMN 10

Line 37, "realtime" should read --real-time--.

COLUMN 12

Line 23, "realtime" should read --real-time--.

COLUMN 17

Line 46, "of" should be deleted.
    Line 47, "101" should read --101 of--.

COLUMN 18

Line 58, "FIG. 1 ¶ The" should read --FIG. 1. The--.

COLUMN 19

Line 42, "transferring" should read --transferring of--.

COLUMN 23

Line 24, "different" should read --difference--.

COLUMN 24

Line 43, "flow-chart(FIGS." should read --flowchart (FIGS.--.

UNITED STATES PATENT AND TRADEMARK OFFICE
CERTIFICATE OF CORRECTION

PATENT NO. : 7,196,713 B1
APPLICATION NO. : 09/328469
DATED : March 27, 2007
INVENTOR(S) : Yoichi Yamagishi It is certified that error appears in the above-identified patent and that said Letters Patent is hereby corrected as shown below:

COLUMN 25

Line 65, "bus" (second occurrence) should read --bus in--.
    Line 67, "bus" (second occurrence) should read --bus in--.

COLUMN 26

Line 9, "the-image" should read --the image--.
    Line 17, "in" should read --in the--.
    Line 32, "include" should read --including--.
    Line 46, "in" should read --in the--.

Signed and Sealed this

Twenty-ninth Day of July, 2008

JON W. DUDAS
*Director of the United States Patent and Trademark Office*